(12) United States Patent
Rachuri et al.

(10) Patent No.: US 9,726,504 B2
(45) Date of Patent: Aug. 8, 2017

(54) COMPUTING SYSTEM WITH STRUCTURE VERTICAL-TIER MECHANISM AND METHOD OF OPERATION THEREOF

(71) Applicant: Samsung Electronics Co., Ltd., Suwon-si, Gyeonggi-Do (KR)

(72) Inventors: Kiran K Rachuri, Mountain View, CA (US); Shalinder S Singh, Mountain View, CA (US); Yoshiya Hirase, Mountain View, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/983,349

(22) Filed: Dec. 29, 2015

(65) Prior Publication Data
US 2017/0184405 A1 Jun. 29, 2017

(51) Int. Cl.
*G01C 21/12* (2006.01)
*G01C 22/00* (2006.01)
*G01C 21/20* (2006.01)

(52) U.S. Cl.
CPC .................. *G01C 21/206* (2013.01)

(58) Field of Classification Search
USPC .......................................... 701/461; 702/160
See application file for complete search history.

(56) References Cited

U.S. PATENT DOCUMENTS

| | | | |
|---|---|---|---|
| 6,446,030 B1 * | 9/2002 | Hoffman | G01C 15/002 |
| | | | 702/159 |
| 7,009,643 B2 | 3/2006 | Nakamura et al. | |
| 7,162,368 B2 | 1/2007 | Levi et al. | |
| 8,180,591 B2 * | 5/2012 | Yuen | A61B 5/0002 |
| | | | 702/160 |
| 8,479,107 B2 | 7/2013 | Vainio et al. | |
| 8,688,375 B2 * | 4/2014 | Funk | G01C 21/165 |
| | | | 340/995.19 |
| 8,704,913 B2 | 4/2014 | Kita | |
| 8,762,101 B2 * | 6/2014 | Yuen | A61B 5/6838 |
| | | | 702/160 |
| 8,856,121 B1 | 10/2014 | Makki et al. | |
| 8,918,463 B2 | 12/2014 | Garcia et al. | |
| 2008/0270880 A1 | 10/2008 | Becker | |
| 2008/0320107 A1 | 12/2008 | Park | |
| 2009/0043504 A1 * | 2/2009 | Bandyopadhyay | G01C 17/38 |
| | | | 701/469 |

(Continued)

OTHER PUBLICATIONS

Vanini, Salvatore; "Adaptive context-agnostic floor transition detection on smart mobile devices", ComoRea Workshop; Mar. 18, 2013.

(Continued)

*Primary Examiner* — Tyler Paige
(74) *Attorney, Agent, or Firm* — IP Investment Law Group

(57) ABSTRACT

A computing system includes: a control circuit configured to: determine environment measurements representing conditions measured about a building structure located at a geographic location; generate a map based on the environment measurements for mapping a tier of the building structure along a vertical direction; and a storage circuit, coupled to the control circuit, configured to store the map for representing the building structure.

20 Claims, 10 Drawing Sheets

(56) References Cited

U.S. PATENT DOCUMENTS

| | | | |
|---|---|---|---|
| 2009/0143972 A1* | 6/2009 | Kitamura | A61B 5/1112 701/504 |
| 2012/0029817 A1* | 2/2012 | Khorashadi | G01C 21/20 701/451 |
| 2012/0059843 A1 | 3/2012 | O'Donnell | |
| 2012/0072052 A1* | 3/2012 | Powers | G05D 1/0044 701/2 |
| 2012/0141023 A1 | 6/2012 | Wang et al. | |
| 2012/0173204 A1 | 7/2012 | Padmanabhan et al. | |
| 2012/0177292 A1 | 7/2012 | Cheon et al. | |
| 2013/0289871 A1 | 10/2013 | Itagaki | |
| 2013/0297198 A1 | 11/2013 | Vande Velde et al. | |
| 2013/0332064 A1* | 12/2013 | Funk | G01C 21/206 701/409 |
| 2013/0335273 A1 | 12/2013 | Pakzad et al. | |
| 2014/0012529 A1 | 1/2014 | Lee et al. | |
| 2014/0081572 A1 | 3/2014 | Poornachandran et al. | |
| 2014/0114567 A1 | 4/2014 | Buchanan et al. | |
| 2014/0156228 A1* | 6/2014 | Molettiere | G06F 19/322 702/189 |
| 2014/0278060 A1* | 9/2014 | Kordari | G01C 21/206 701/422 |
| 2015/0119087 A1 | 4/2015 | Lee et al. | |
| 2015/0185022 A1 | 7/2015 | Yoo et al. | |
| 2015/0192414 A1 | 7/2015 | Das et al. | |

OTHER PUBLICATIONS

H.Wang, H.Lenz, A.Szabo, U.Hanebeck, and J.Bamberger; "Fusion of Barometric Sensors, WLAN Signals and Building Information for 3-D Indoor/Campus Localization"; MFI 2006.

H.Ye, T.Gu, X.Tao, and J. Lu; "B-Loc: Scalable Floor Localization using Barometer on Smartphone"; Mobile Ad Hoc and Sensor Systems, 2014 IEEE 11th International Conference, pp. 127-135, Oct. 2014.

K.Muralidharan, A.Khan, A.Misra, R.Balan, and S.Agarwal; "Barometric Phone Sensors—More Hype Than Hope!"; ACM HotMobile 2014.

International PCT Application No. PCT/KR2016/005881, Filing Date Jun. 3, 2016, Search Report dated Aug. 24, 2016.

* cited by examiner

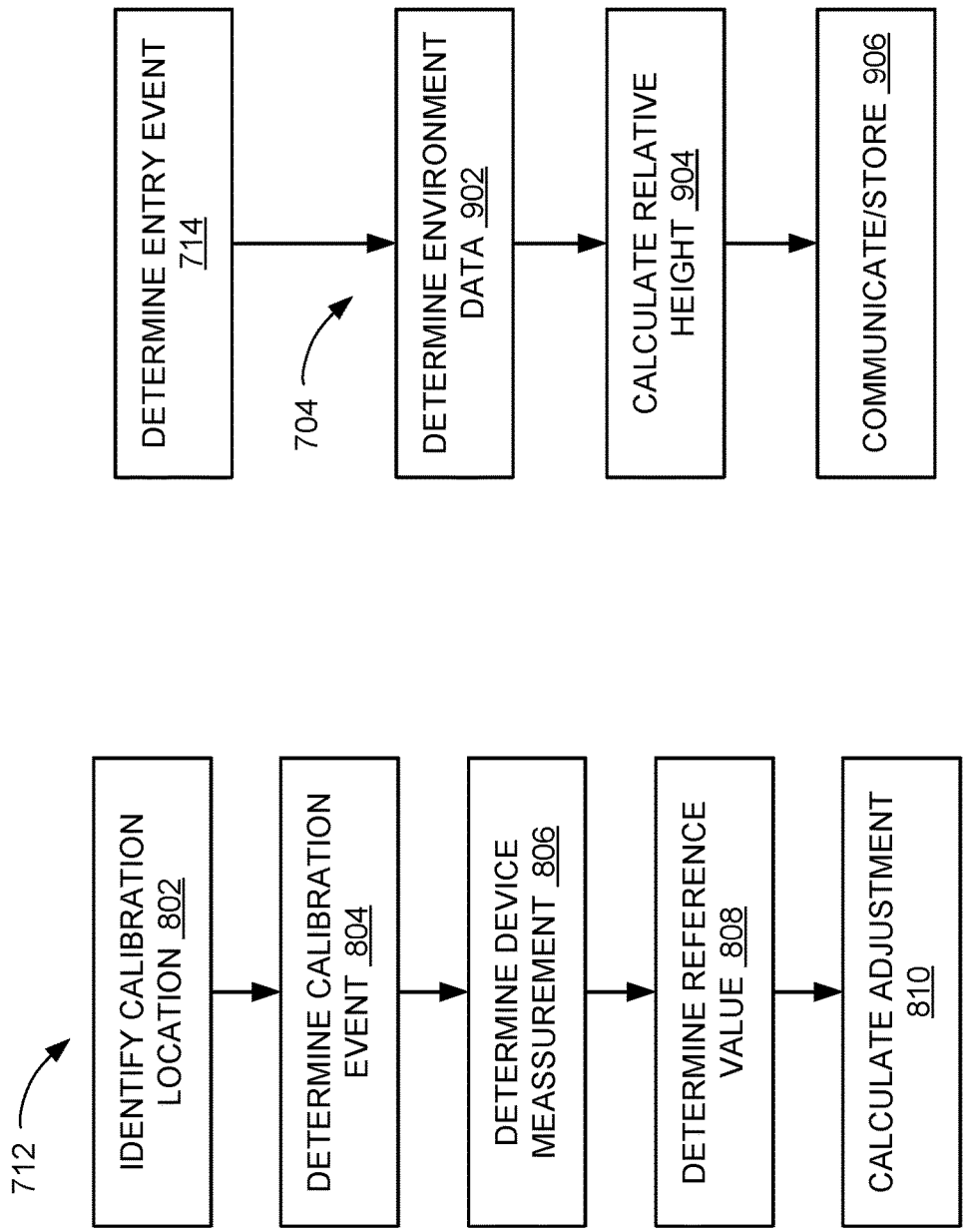

COMPUTING SYSTEM WITH STRUCTURE VERTICAL-TIER MECHANISM AND METHOD OF OPERATION THEREOF

CROSS-REFERENCE TO RELATED APPLICATION(S)

This application incorporates the subject matters in U.S. patent application Ser. No. 14/549,054 filed Nov. 20, 2014, titled "SYSTEM FOR DETERMINING THE LOCATION OF ENTRANCES AND AREAS OF INTEREST", and the subject matters thereof are incorporated herein by reference thereto.

TECHNICAL FIELD

An embodiment of the present invention relates generally to a computing system, and more particularly to a system with a structure vertical-tier mechanism.

BACKGROUND

Modern consumer and industrial electronics, especially devices such as computing systems, cellular phones, wearable device, such as health monitors or smart watches, and combination devices are providing increasing levels of functionality to support modern life including online social networks. Research and development in the existing technologies can take numerous different directions.

As users become more empowered with the growth in computing, various uses begin to take advantage of this new device space. There are many technological solutions to take advantage of this new device capability to provide increasing functionalities to the user. However, users often face inadequate functionalities regarding vertical localization or mapping within structures.

Thus, a need still remains for a computing system with structure vertical-tier mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment provides a computing system, including: a control circuit configured to: determine environment measurements representing conditions measured within a building structure located at a geographic location; generate a map based on the environment measurements for mapping a tier of the building structure along a vertical direction; and a storage circuit, coupled to the control circuit, configured to store the map for representing the building structure.

An embodiment provides a method of operation of a computing system including: determining environment measurements representing conditions measured within a building structure located at a geographic location; and generating with a control circuit a map based on the environment measurements for mapping a tier of the building structure along a vertical direction.

A non-transitory computer readable medium including instructions executable by a control circuit for a computing system, the instructions comprising: determining environment measurements representing conditions measured within a building structure located at a geographic location; and generating a map based on the environment measurements for mapping a tier of the building structure along a vertical direction.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 8 is a detailed exemplary flow chart for calibrating device step of FIG. 7.

FIG. 9 is a detailed exemplary flow chart for calculating entry-exit altitude step of FIG. 7.

DETAILED DESCRIPTION

Figure 1:
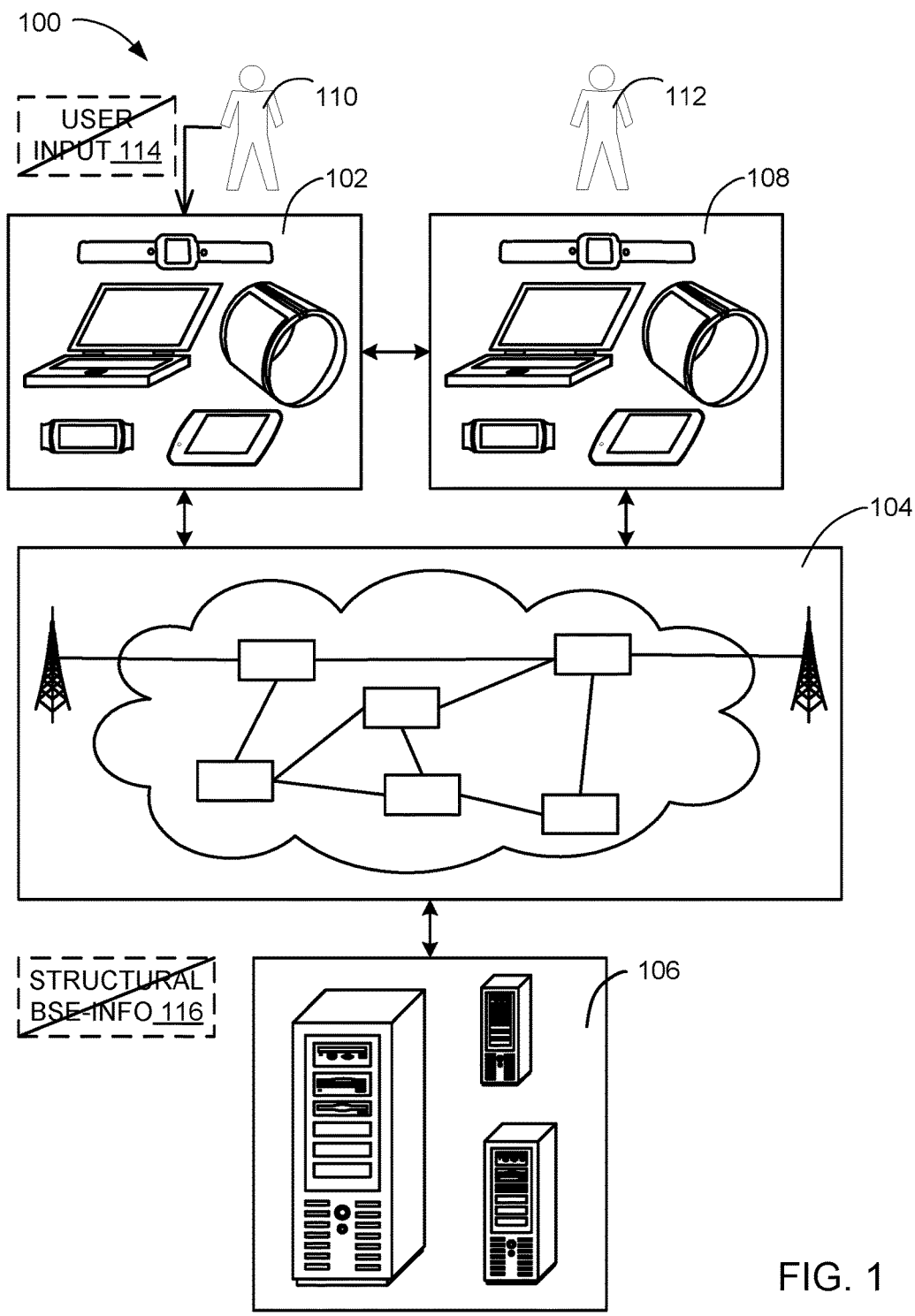
FIG. 1 is a computing system with a structure vertical-tier mechanism in an embodiment of the present invention.

The following embodiments of the present invention provide an unsupervised mechanism for locating a user device within a building structure or vertically mapping the building structure. The localization process, the mapping process, or a combination thereof can be based on dynamically calibrating the user device with calibration measurement at calibration location. The localization process, the mapping process, or a combination thereof can further be based on normalizing sensor data, including environment measurement, to calculate a relative altitude.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "vertical" referred to herein can include a direction or an orientation parallel or coincident with a direction of gravitational force. The terms "up" and "down" can be opposing directions along vertical from a point of reference, such as for a person, an entity, a device, or a combination thereof relative to a surface or a sea-level. The term "horizontal" referred to herein can include a direction or an orientation perpendicular or orthogonal to vertical, including directions or orientation along a plane parallel to a ground surface.

The term "unsupervised" referred to herein can include a description or a classification of a process, a circuit, a method, a mechanism, or a combination thereof implemented without manual input, without any prior assumptions, and without any prior relevant externally provided information. More specifically, "unsupervised" referred to herein can describe or classify the process, the circuit, the method, the mechanism, or a combination thereof without manual input or responses from a user or a system administrator, without relevant externally provided information regarding buildings or structures, and without any assumptions regarding vertical dimensions of the buildings or structures.

Referring now to FIG. 1, therein is shown a computing system 100 with a structure vertical-tier mechanism in an embodiment of the present invention. The computing system 100 includes a first device 102, such as a client device, connected to a second device 106, such as a client device or a server. The first device 102 can communicate with the second device 106 with a network 104, such as a wireless or wired network.

For example, the first device 102 can be of any of a variety of consumer devices, such as a cellular phone, a personal digital assistant, a notebook computer, a tablet computer, a wearable device, or other multi-functional mobile communication or entertainment device. The first device 102 can couple, either directly or indirectly, to the network 104 to communicate with the second device 106 or can be a stand-alone device.

For illustrative purposes, the computing system 100 is described with the first device 102 as a mobile computing device, although it is understood that the first device 102 can be different types of devices. For example, the first device 102 can also be a non-mobile computing device, such as a server, a server farm, or a desktop computer. Also for example, the first device 102 can be a standalone device, or can be incorporated with a vehicle, such as a car, a truck, a bus, or a train.

The second device 106 can be any of a variety of centralized or decentralized computing devices. For example, the second device 106 can be a computer, a set of grid computing resources, a virtualized computer resource, a server, a cloud computing resource, a routers, a switch, a set of peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device.

The computing system 100 can further include a further device 108. The further device 108, such as a client or a server, can be connected to the first device 102, the second device 106, or a combination thereof. The further device 108 can be similar to the first device 102, the second device 106, or a combination thereof.

For example, the further device 108 can include any variety of consumer devices, wearable devices, servers, stationary or mobile devices, centralized or decentralized devices, or a combination thereof. The further device 108 can couple, either directly or indirectly, to the network 104 to communicate with another device, couple directly to another device, or can be a stand-alone device.

For illustrative purposes, the computing system 100 is described with the further device 108 as a mobile computing device, although it is understood that the further device 108 can be different types of devices. For example, the further device 108 can also be a non-mobile computing device, such as a server, a server farm, or a desktop computer.

Also for illustrative purposes, the computing system 100 is shown with the first device 102, the second device 106, and the further device 108 as end points of the network 104, although it is understood that the computing system 100 can have a different partition between the first device 102, the second device 106, the further device 108, and the network 104. For example, the first device 102, the second device 106, the further device 108, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

A system user 110 can include a person or an entity utilizing the computing system 100. The system user 110 can utilize the computing system 100 or a device therein, such as the first device 102, the second device 106, or a combination thereof.

For a more specific example, the system user 110 can be associated with the first device 102. The system user 110 can include the person or the entity directly interfacing or directly interacting with the first device 102, having ownership or control of the first device 102, having direct physical contact with the first device 102, interacting or interfacing with the second device 106 through the first device 102, or a combination thereof.

A further user 112 can include a person or an entity different from the system user 110 utilizing the computing system 100 or a device therein, such as the second device 106, the further device 108, or a combination thereof. For a more specific example, the further user 112 can include the person or the entity directly interfacing or directly interacting with the further device 108, having ownership or control of the further device 108, having direct physical contact with the further device 108, interacting or interfacing with the second device 106 through the further device 108, or a combination thereof.

The computing system 100 can utilize one or more unsupervised mechanisms to vertically map insides of buildings or structures, locate users within the buildings, or a combination thereof. The computing system 100 can implement the one or more unsupervised mechanisms without utilizing a direct user input 114, a structural base-information 116, or a combination thereof.

The direct user input 114 is stimulus or input from a user, such as the system user 110 or the further user 112, regarding a specific purpose, process, feature, objective, or a combination thereof. The direct user input 112 can include an input or a response from the user such as a selection, an audible sound, a command, a bodily movement, a device movement, a physical contact, or a combination thereof.

The structural base-information 116 is a representation or a description of the buildings or structures generated external to the computing system 100 and provided to the computing system 100 from another source. The structural base-information 116 can include a representation or a description of a size, a shape, a dimension, or a combination thereof of the buildings or structures from another service, another device, one or more end-users, or a combination thereof external to the computing system 100. The structural base-information 116 can include a number of floors, a vertical distance or separation between floors, an altitude of one or more floors, or a combination thereof.

For example, the structural base-information 116 can include a diagram, a building plan or a floor plan, a set of dimensions, or a combination thereof of the buildings or structures. Also for example, the structural base-information 116 can include a number of floors or levels within the buildings or structures, vertical locations of the floors or levels, a distance or a degree of separation between the floors or levels, or a combination thereof for the structural base-information 116.

The computing system 100 can utilize information generated, measured, detected, calculated, or a combination thereof from the first device 102, the further device 108, or a combination thereof to map insides of the buildings or structures, locate users inside the buildings or structures, or a combination thereof. The computing system 100 can vertically map the buildings or structures, such as identify or vertically locate floors or levels, vertically locate users therein, or a combination thereof using the device-sourced information, such as sensor data, without using the direct user input 114, and without using the structural base-information 116. Details regarding the mapping process, the locating process, or a combination thereof are discussed below.

Figure 2:
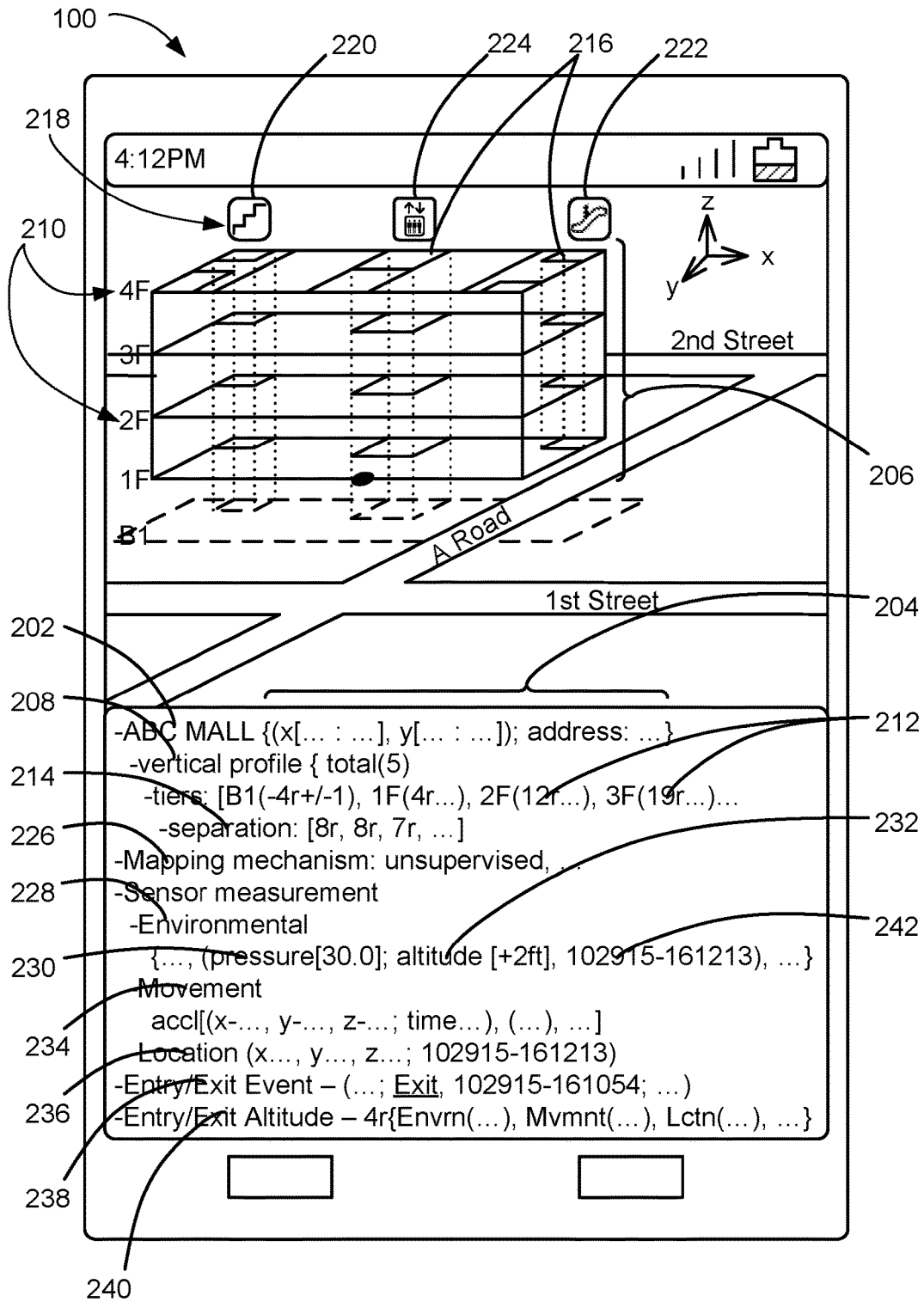
FIG. 2 is an example of a process for the embodiment visually illustrated on a display interface of the computing system.

Referring now to FIG. 2, therein is shown an example of a process for the embodiment visually illustrated on a display interface of the computing system 100. The computing system 100 can include a representation of a building structure 202. The display interface can indicate or represent the building structure 202. The building structure 202 can include a building or a construction existing at a geographic location. The building structure 202 can include a single-tier building or a multi-level building.

The building structure 202 can include an enclosed building, such as including a roof and complete set of walls or windows, represent an open structure, such as a structure without a roof or at least one of the walls, or a combination thereof. For example, the building structure 202 can include a house, an apartment structure, a skyscraper or an office building, a bridge, an overpass, a stadium, or a tower.

The building structure 202 can be located at a structure geographic location 204. The structure geographic location 204 can include an indication of a geographical location. For example, the structure geographic location 204 can include a set of coordinates, such as for global positioning system (GPS) or latitude-longitude system, a street address, a set of intersecting streets or paths, or a combination thereof.

The computing system 100 can generate an internal map 206 of the building structure 202 using unsupervised method, process, mechanism, or a combination thereof, without utilizing the direct user input 114 of FIG. 1, and without utilizing the structural base-information 116 of FIG. 1. The internal map 206 is a representation of locations of positions within the building structure 202.

The internal map 206 can include a three-dimensional representation. For example, the internal map 206 can include a two-dimensional representation of one or more levels according to a vertical mapping for the corresponding one or more levels. For a more specific example, one representation can be generated, displayed, or processed at a time according to a height or altitude corresponding to a level. Also for example, the internal map 206 can include a three-dimensional representation of all levels including their vertical mapping within the representation.

The internal map 206 can include a vertical profile 208 representing vertical information or relationship of a tier 210 within the building structure 202. The tier 210 is a level or a floor corresponding to a height or an altitude. The tier 210 can include one floor in a single-tiered structure or one of the floors in a multi-tiered building. The internal map 206 can include a mapping or a description of each instance of the tier 210, such as a two-dimensional location information or a horizontal mapping, according to the vertical profile 208.

The vertical profile 208 is a representation of one or more instances of the tier 210 for an instance of the building structure 202. The vertical profile 208 can include a total-number of floors, an identification of the one or more floors, vertical information for the one or more floors, or a combination thereof. For example, the vertical profile 208 can include a relative tier altitude 212, a tier separation profile 214, or a combination thereof. The relative tier altitude 212, the tier separation profile 214 can be calculated based on information from user devices, such as altitude or other environmental data.

The relative tier altitude 212 is a parameter describing a vertical location of the corresponding instance of the tier 210. The vertical profile 208 can include the relative tier altitude 212 describing a vertical location of each instance of the tier 210 included within the building structure 202. The relative tier altitude 212 can include the parameter describing a height or an altitude of the corresponding instance of the tier 210. The relative tier altitude 212 can include a set of parameters, a range of values, a threshold value or range, or a combination thereof corresponding to each tier. The relative tier altitude 212 can be relative to the ground tier or entrance-exit altitude.

The relative tier altitude 212 can be based on various data, measurement, readings, or a combination thereof from the first device 102, of FIG. 1, the further device 108 of FIG. 1, at one time, at multiple times, over a period, or a combination thereof. The relative tier altitude 212 can be based on a measurement for height or altitude normalized or further processed by the computing system 100.

The tier separation profile 214 is a description regarding relative positions or locations between tiers. The tier separation profile 214 can represent an amount of vertical separation between floors for the building structure 202. The tier separation profile 214 can include a measure of distance along the vertical direction between corresponding tiers.

The internal map 206 can further include a tier-change access location 216 and a tier-change type 218 for the building structure 202 including multiple instances of the tier 210. The tier-change access location 216 is a representation of a location within the building structure 202 designed to be utilized by people for traveling between floors. The tier-change access location 216 can include one or more locations on one instance of the tier 210, on another instance of the tier 210, such as for connected or adjacent floors, or a combination thereof.

The tier-change type 218 is a representation or a description of a mechanism designed to be utilized by people for traveling between floors at the tier-change access location 216. The tier-change type 218 can include a label or a category describing the mechanism for traversing between levels. For example, the tier-change type 218 can include a vertical path 220, an escalator 222, an elevator 224, or a combination thereof.

The vertical path 220 can include a path designated to be traveled by the system user 110 of FIG. 1, the further user 112 of FIG. 1, or a combination thereof without any mechanical assistance. The vertical path 220 can include stairs, ladders, inclined walkway, or a combination thereof. The elevator 224 can include a machine that carries people up or down between levels or floors in the building structure 202. The escalator 222 can include a set of mechanically moving stairs, belts, or a combination thereof, that take people up or down between levels or floors in the building structure 202.

The computing system 100 can use a tier mapping mechanism 226 for identifying and locating one or more instances of the tier 210 within the building structure 202. The tier mapping mechanism 226 can include a process, a method, an instruction or a function, a circuit, a sequence thereof, or a combination thereof designed to recognize one or more instances of the tier 210, a vertical position or relationship thereof, or a combination thereof.

The tier mapping mechanism 226 can utilize sensor data from the first device 102, the further device 108, or a combination thereof for the computing system 100 corresponding to the system user 110, the further user 112, or a combination thereof to identify and locate the levels or tiers. The tier mapping mechanism 226 can utilize the sensor data from one or multiple users, at one time or sourced at various times, or a combination thereof.

The tier mapping mechanism 226 can be an unsupervised mechanism. The tier mapping mechanism 226 can identify and locate the levels without the direct user input 114 and without the structural base-information 116. Details regarding the tier mapping mechanism 226 are described below.

The sensor data can include parameter or data describing the environment or movement of the corresponding device. The sensor data can include an environment measurement 228, a movement measurement 234, a device location 236, or a combination thereof.

The environment measurement 228 is data or information from a device within the computing system 100 regarding surroundings of the device. The environment measurement 228 can be data or information sourced or measured by the first device 102, the further device 108, a component or a circuit therein, or a combination thereof. The environment measurement 228 can describe surroundings of the device, such as temperature, brightness, or a combination thereof.

The environment measurement 228 can further include a pressure measurement 230. The pressure measurement 230 is a description of an amount of force produced by a surrounding gas or liquid for the device. The pressure measurement 230 can include a barometric measurement or a measurement for air pressure. The pressure measurement 230 can be associated with a device altitude 232.

The device altitude 232 is a vertical location or a height of the corresponding device relative to a reference location or height. The device altitude 232 can be measured or represented relative to sea-level or any other reference altitude, such as an altitude of a barometer station. The device altitude 232 can be measured using the pressure sensor on the device. The device altitude 232 can include a measure or a parameter determined by and unique to the sourcing device. The device altitude 232 can depend on or be affected by sensitivity or accuracy of the measuring or calculating device, a time of day, weather, or a combination thereof.

The device altitude 232 can be measured by the sourcing device, calculated for the corresponding device, or a combination thereof. For example, the device altitude 232 can be measured or determined based on processing GPS signals, based on triangulation or localization processes, or a combination thereof applied for three-dimensional localization. Also for example, the device altitude 232 can be calculated or derived from the environment measurement 228, such as the pressure measurement 230.

The device altitude 232 can be measured, determined, calculated, derived, or a combination thereof using parameters sourced or detected at the user device, such as the first device 102, the further device 108, or a combination thereof. The device altitude 232 can also be determined, calculated, derived, or a combination thereof using one or more devices, such as the first device 102, the second device 106 of FIG. 1, the further device 108, or a combination thereof.

The movement measurement 234 is information or data regarding physical displacement of the device. The movement measurement 234 can include acceleration, speed or velocity, or a combination thereof for the first device 102, the further device 108, or a combination thereof. The movement measurement 234 can be generated or measured based on GPS measurements, accelerometer, speedometer, or a combination thereof.

The device location 236 is information or data regarding geographic location of the device. The device location 236 can include a representation of geographic location of the first device 102, the further device 108, or a combination thereof. The device location 236 can locate the device along a horizontal plane, such as on ground or on map.

For example, the device location 236 can include coordinates, address, geographic markers, intersecting set of streets or paths, or a combination thereof. Also for example, the device location 236 can be based on GPS system or processes, dead-reckoning mechanism, triangulation location mechanism, or a combination thereof. As a more specific example, the device location 236 can locate the device on the ground outside of the building structure 202, along a two-dimensional plane on an instance of the tier 210 within the building structure 202, or a combination thereof.

The computing system 100 can further calculate the device altitude 232 based on the pressure measurement 230, the device location 236, the movement measurement 234, or a combination thereof. For example, the device altitude 232 can further be measured, detected, determined, calculated, derived, or a combination thereof from the device location 236, dead-reckoning calculation utilizing the movement measurement 234, or a combination thereof.

The computing system 100 can further identify information regarding entry or exit with respect to the building structure 202. The computing system 100 can determine an entry-exit event 238, an entry-exit altitude 240, or a combination thereof.

The entry-exit event 238 is an occurrence of ingress or egress of the corresponding device relative to the building structure 202. The entry-exit event 238 can represent the first device 102, the further device 108, or a combination thereof entering or exiting the building structure 202.

The computing system 100 can determine the entry-exit event 238 based on the device location 236, the structure geographic location 204, or a combination thereof. For example, the entry-exit event 238 can be based on comparison or overlap between the device location 236 and the structure geographic location 204. Also for example, the entry-exit event 238 can be based on status or availability of signal, such as GPS signal or signals from specific wireless routers.

The entry-exit altitude 240 is a vertical location or a height associated with the entry-exit event 238. The entry-exit altitude 240 can represent a vertical location or a height of a door, an access point, an entryway, an exit, or a combination thereof for the building structure 202. The entry-exit altitude 240 can be based on the device altitude 232, further processing or normalization thereof, or a combination thereof at the time of the entry-exit event 238.

The sensor data can correspond to a time stamp 242. The time stamp 242 can be a representation or a record of the moment in time corresponding to the sensor data. The time stamp 242 can describe the time when the device made or produced the sensor data. The time stamp 242 can be stored with the corresponding instance of the sensor data.

Figure 3:
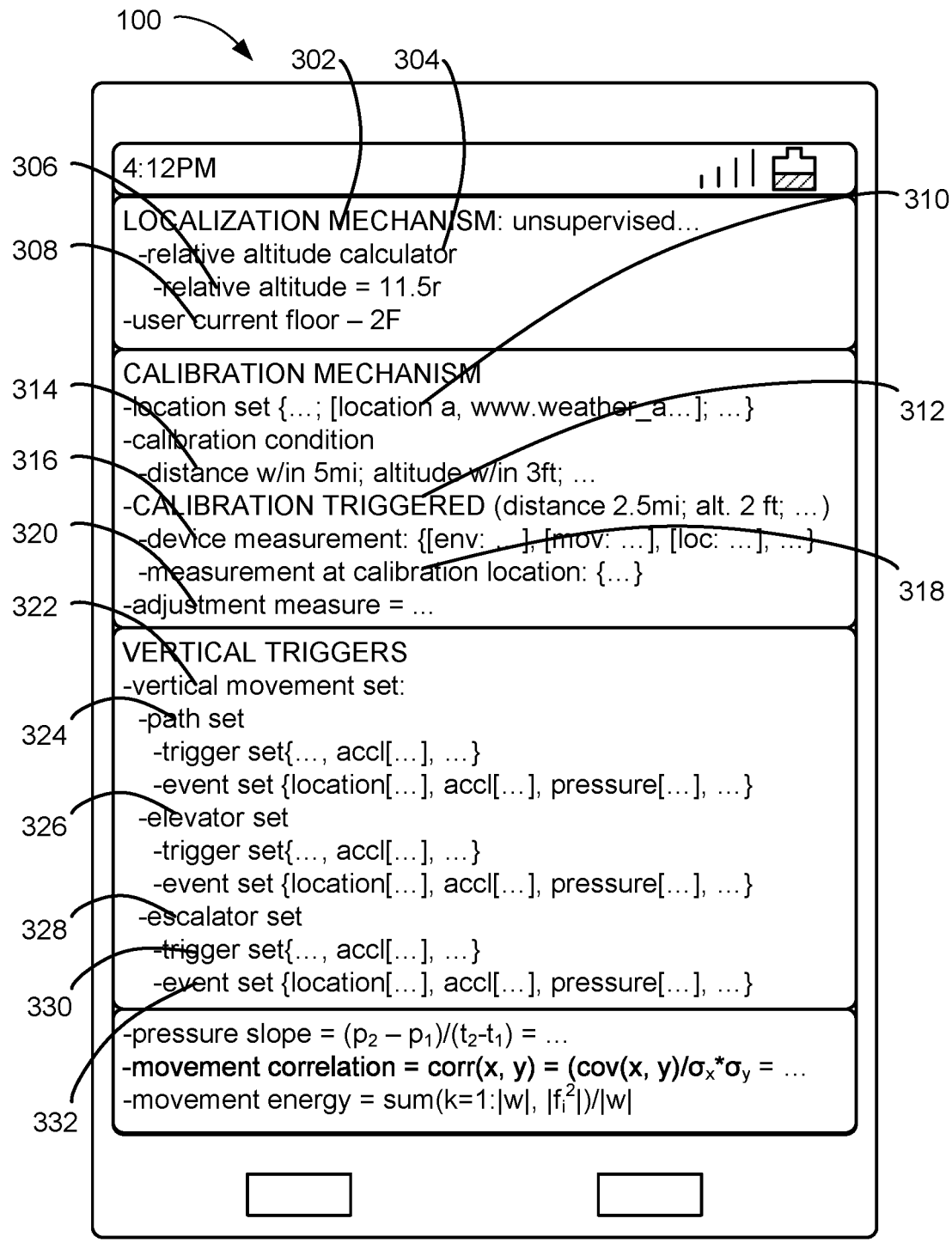
FIG. 3 is a further example of the process for the embodiment visually illustrated on the display interface of the computing system.

Referring now to FIG. 3, therein is shown a further example of the process for the embodiment visually illustrated the display interface of the computing system 100. The computing system 100 can utilize a vertical localization mechanism 302 to vertically locate the first device 102 of FIG. 1, the further device 108 of FIG. 1, relative to the tier 210 of FIG. 2 within the building structure 202 of FIG. 2.

The vertical localization mechanism 302 is a process, a method, an instruction or a function, a circuit, a sequence thereof, or a combination thereof for identifying and locating one or more devices relative to the tier 210 within the building structure 202. The vertical localization mechanism 302 can utilize the sensor data from the first device 102, the second device 106 of FIG. 1, the further device 108, or a combination thereof. The vertical localization mechanism 302 can calculate the device altitude 232 of FIG. 2, further process the device altitude 232, utilize the internal map 206 of FIG. 2, or a combination thereof for identifying and locating one or more devices relative to the tier.

The vertical localization mechanism 302 can include a relative altitude calculator 304 for calculating a relative altitude 306. The relative altitude 306 is a representation of altitude normalized for the computing system 100. The relative altitude 306 can be calculated based on normalizing the device altitude 232.

The relative altitude 306 can be an output of normalization process implemented by the relative altitude calculator 304 to remove the differences or inconsistencies in the instances of the device altitude 232. The relative altitude 306 can be based on normalizing the user sensor data, the device altitude 232, or a combination thereof provided by devices or components with different accuracy levels or sensitivity, different times for measurement, different weather conditions, or a combination thereof.

The relative altitude 306 can further include a representation of altitude relative to a reference point. The relative altitude 306 can be specific to or correspond to the building structure 202. The relative altitude 306 can be relative to a base level or a reference altitude for the corresponding instance of the building structure 202. For example, the relative altitude 306 can be based on the entry-exit event 238 of FIG. 2, the entry-exit altitude 240 of FIG. 2, the user sensor data corresponding thereto, or a combination thereof.

The relative altitude calculator 304 is a process, a method, an instruction or a function, a circuit, a sequence thereof, or a combination thereof for normalizing parameters for the device altitude 232 across various factors. The relative altitude calculator 304 can process the user sensor data, such as the environment measurement 228 of FIG. 2, the movement measurement 234 of FIG. 2, the device location 236 of FIG. 2, or a combination thereof as input. The relative altitude calculator 304 can further process the device altitude 232 as input.

The relative altitude calculator 304 can be implemented for calculating the relative altitude 306 as an output. The relative altitude calculator 304 can calculate the relative altitude 306 based on normalizing the differences in the input parameters caused by differences in accuracy levels or sensitivity for different devices or circuits, differences in times for measurement, differences in weather conditions, or a combination thereof.

The relative altitude calculator 304 can be implemented to calculate the relative altitude 306 for vertically locating the device relative to the tier 210 within the building structure 202, identifying and mapping the tier 210 of the building structure 202, or a combination thereof. The relative altitude calculator 304 can be implemented to calculate the relative altitude 306 for the tier mapping mechanism 226 of FIG. 2.

The vertical localization mechanism 302 can further utilize the relative altitude 306 to determine a user current floor 308. The user current floor 308 is a representation or an identification of an instance of the tier 210 occupied by the corresponding instance of the system user 110 of FIG. 1, the further user 112 of FIG. 1, or a combination thereof. The user current floor 308 can include a representation of the current vertical location of the end user or the corresponding device relative to the corresponding instance of the building structure 202.

It has been discovered that the relative altitude 306 provides accurate robust identification of tiers within buildings and localization relative to tiers. The relative altitude 306 allows for normalization of data sourced across different devices, across various times or weather conditions, or a combination thereof. The normalization can enable use of data from various sources in identifying and locating the tier 210 and the vertical location of the device relative to the tier 210, increasing the accuracy. The relative altitude 306 can further be used to eliminate need for the direct user input 114 of FIG. 1 and the structural base-information 116 of FIG. 1, increasing the robustness of mapping or localization processes utilizing the normalized data and further increasing the usability. Details regarding the relative altitude 306 and the relative altitude calculator 304 are described below.

The computing system 100 can further calibrate measurements for each of the devices therein. The computing system 100 can calibrate the first device 102, the further device 108, or a combination thereof based on a calibration location 310 and a calibration event 312.

The calibration location 310 can include a geographic location associated with calibrating the measurements of a device, such as the sensor data. The calibration location 310 can include a known location associated with a known or validated conditions or measurement values for comparison to the sensor data. The calibration location 310 can include a location where the altitude information can be found on a public or a private web pages or services. The calibration location 310 can be used to estimate the error in the barometer sensor of the device.

For example, the calibration location 310 can include a weather station, a publically accessible barometer, a location associated with publically available web service, or a combination thereof. Also for example, the calibration location 310 can further include a geographic location with a confirmed or validated altitude known to the computing system 100. Also for example, the calibration location 310 can further include a barometer station.

The computing system 100 can utilize the calibration location 310 and conditions at the calibration location 310 to normalize the device. The computing system 100 can utilize the calibration location 310 for data specifically relevant to the user device instead of utilizing a barometric fingerprint map.

The calibration event 312 can include an occurrence of the corresponding device satisfying conditions for initiating the calibration process. The calibration event 312 can correspond to implementation of the calibration process based on satisfying a calibration condition 314. The calibration condition 314 is a requirement for initiating or implementing the calibration process.

The calibration condition 314 can include the requirement to be met by the device subject to the calibration process. For example, the calibration condition 314 can include a value or a parameter of or from, a status or a state of, or a combination thereof for the first device 102, the further device 108, or a combination thereof. The calibration condition 314 can be for initiating or implementing the calibration process for the first device 102, the further device 108, or a combination thereof meeting the calibration condition 314.

The calibration condition 314 can be based on the device location 236 and the calibration location. For example, the calibration condition 314 can include a threshold distance between the calibration location 310 and the device location 236 corresponding to the first device 102, the further device 108, or a combination thereof. Also for example, the calibration condition 314 can include one or more specific locations for the device location 236 near the calibration location 310. Also for example, the calibration condition 314 can include a suggested route or an estimated route for the first device 102, the further device 108, or a combination thereof including one or more portions within the predetermined area relative to the device location 236.

The calibration condition 314 can be based on altitude of the predetermined area or the area within the threshold distance relative to the calibration location 310. For example, the calibration condition 314 can be based on the predetermined area or the area within the threshold distance having same altitude or altitude within a threshold range relative to the calibration location 310.

The calibration condition 314 can further be based on a region or a distance relative to the calibration location 310 corresponding to similar environmental conditions. For example, the calibration condition 314 can be based on the predetermined area or the area within the threshold distance being affected by the same weather pattern, associated with same barometric readings, or a combination thereof relative to the calibration location 310.

The computing system 100 can use a calibration measurement 316, a reference measurement 318, or a combination thereof to calibrate the device or measurement thereof. The calibration measurement 316 is an instance of the sensor data from the corresponding device associated with the calibration event 312.

The calibration measurement 316 can include the environment measurement 228, such as the pressure measurement 230 of FIG. 2 or the device altitude 232, from the first device 102, the further device 108, or a combination thereof meeting the calibration condition 314. For example, the calibration measurement 316 can include barometric measurement, the GPS calculation result, the altitude calculation result, or a combination thereof from the first device 102, the further device 108, or a combination thereof at the time of the calibration event 312 or as measured immediately following determination of the calibration event 312.

The reference measurement 318 is a known or a verified value corresponding to the calibration location 310. The reference measurement 318 can include environmental measurement or indication having the same type as the calibration measurement 316. For example, the reference measurement 318 can include barometric measurement, the GPS coordinate, the altitude, or a combination thereof for the calibration location 310 at the time of the calibration event 312 or detected immediately following determination of the calibration event 312.

The reference measurement 318 can include atmospheric pressure or barometric measurement at the calibration location 310, at sea level, or a combination thereof. The reference measurement 318 can be determined based on publically available information, information directly from the calibration location 310, or a combination thereof.

The computing system 100 can calculate a device adjustment measure 320 for calibrating the device. The device adjustment measure 320 is a corrective parameter corresponding to the sensor data for a device. The device adjustment measure 320 can be for correcting the pressure measurement 230, the device altitude 232, or a combination thereof sourced from the first device 102, the further device 106, or a combination thereof meeting the calibration condition 314.

The device adjustment measure 320 can be based on the calibration measurement 316 and the reference measurement 318. For example, the device adjustment measure 320 can be based on a difference between the calibration measurement 316 and the reference measurement 318. Also for example, the device adjustment measure 320 can be based on an average of the reference measurement 318, an average of the calibration measurement 316, an average of the difference between the calibration measurement 316 and the reference measurement 318, or a combination thereof.

The device adjustment measure 320 can be applied to the sensor data to adjust the sensor data. The device adjustment measure 320 can be for correcting or adjusting for inaccuracies, offsets, sensitivity levels, or a combination thereof characteristic to corresponding device or a component therein.

The computing system 100 can further implement the vertical localization mechanism 302, the tier mapping mechanism 226, or a combination thereof based on movement of the system user 110, the further user 112, or a combination thereof or their corresponding devices. The computing system 100 can initiate one or more processes for vertically locating the first device 102, the further device 108, or a combination thereof based on the user sensor data thereof. The computing system 100 can further initiate one or more processes for mapping the tier 210 based on the user sensor data of the first device 102, the further device 108, or a combination thereof.

The computing system 100 can utilize a vertical movement set 322 for initiating one or more processes. The vertical movement set 322 is a template set or threshold of the sensor data corresponding to the vertical transition or traversal between tiers. The vertical movement set 322 can include a value, a range, a pattern or a sequence thereof, or a combination thereof for the environment measurement 228, the movement measurement 234, the device location 236, or a combination thereof.

The vertical movement set 322 can include data or values characteristic of the system user 110 or the further user 112 carrying the first device 102 or the further device 108 and moving up or down between tiers of the building structure 202. The vertical movement set 322 can correspond to the tier-change type 218 of FIG. 2.

The vertical movement set 322 can be for recognizing or identifying the tier-change type 218. For example, the vertical movement set 322 can include a path-movement set 324 corresponding to a user ascending or descending stairs, ladders, or a combination thereof, an elevator-movement set 326, an escalator-movement set 328, or a combination thereof.

The path-movement set 324 can be the template set or threshold of the sensor data corresponding to the vertical path 220 of FIG. 2. The elevator-movement set 326 can be the template set or threshold of the sensor data corresponding to the elevator 224 of FIG. 2. The escalator-movement set 328 can be the template set or threshold of the sensor data corresponding to the escalator 222 of FIG. 2.

Also for example, the vertical movement set 322 can be based on a pressure slope, a movement direction correlation, a movement energy, or a combination thereof. The pressure slope is a relationship of or a change in the pressure measurement 230 over time.

The movement direction correlation is a pattern or a relationship in or between directional components of the movement measurement 234 from an accelerometer sensor of the user device. The movement direction correlation can be based on horizontal component of the movement measurement 234, vertical component of the movement measurement 234, or a combination thereof. As a more specific example, the movement direction correlation can be based on a covariance of the components of the movement measurement 234 along orthogonal axes, such as horizontal and vertical.

The movement energy is an amount of energy associated with the movement of the device. The movement energy can be based on the movement measurement 234, a sequence of coordinates or locations, or a combination thereof for the corresponding device. As a more specific example, the movement energy can be based on discrete Fast Fourier Transform (FFT), squared magnitude values of the movement measurement 234 over time or the sequence of the device location 236 over time, or a combination thereof.

The vertical movement set 322 can further include a vertical change trigger 330. The vertical change trigger 330 is a template set or threshold of the sensor data for initially recognizing the vertical transition or traversal between tiers. The vertical change trigger 330 can be for identifying the movement measurement 234 typical for beginning portion for the vertical transition or traversal between tiers.

The vertical change trigger 330 can initiate a further process, a different circuit, a further method, or a combination thereof. For example, the vertical change trigger 330 can initiate determination of the tier-change type 218, the tier mapping mechanism 226, the vertical localization mechanism 302, or a combination thereof. Also for example, the vertical change trigger 330 can be for recognizing a pattern of acceleration measurements using one circuit and for subsequently initiating a different circuit or a different process using the different circuit.

Also for example, the vertical change trigger 330 can initiate the process for recognizing or determining a vertical movement event 332. The vertical movement event 332 is a determination that the device has vertically moved from one tier to another. The vertical movement event 332 can be determined based on the vertical movement set 322 following a trigger. The trigger can be based on identifying of a match in the accelerator measurements and the vertical change trigger 330.

Figure 4:
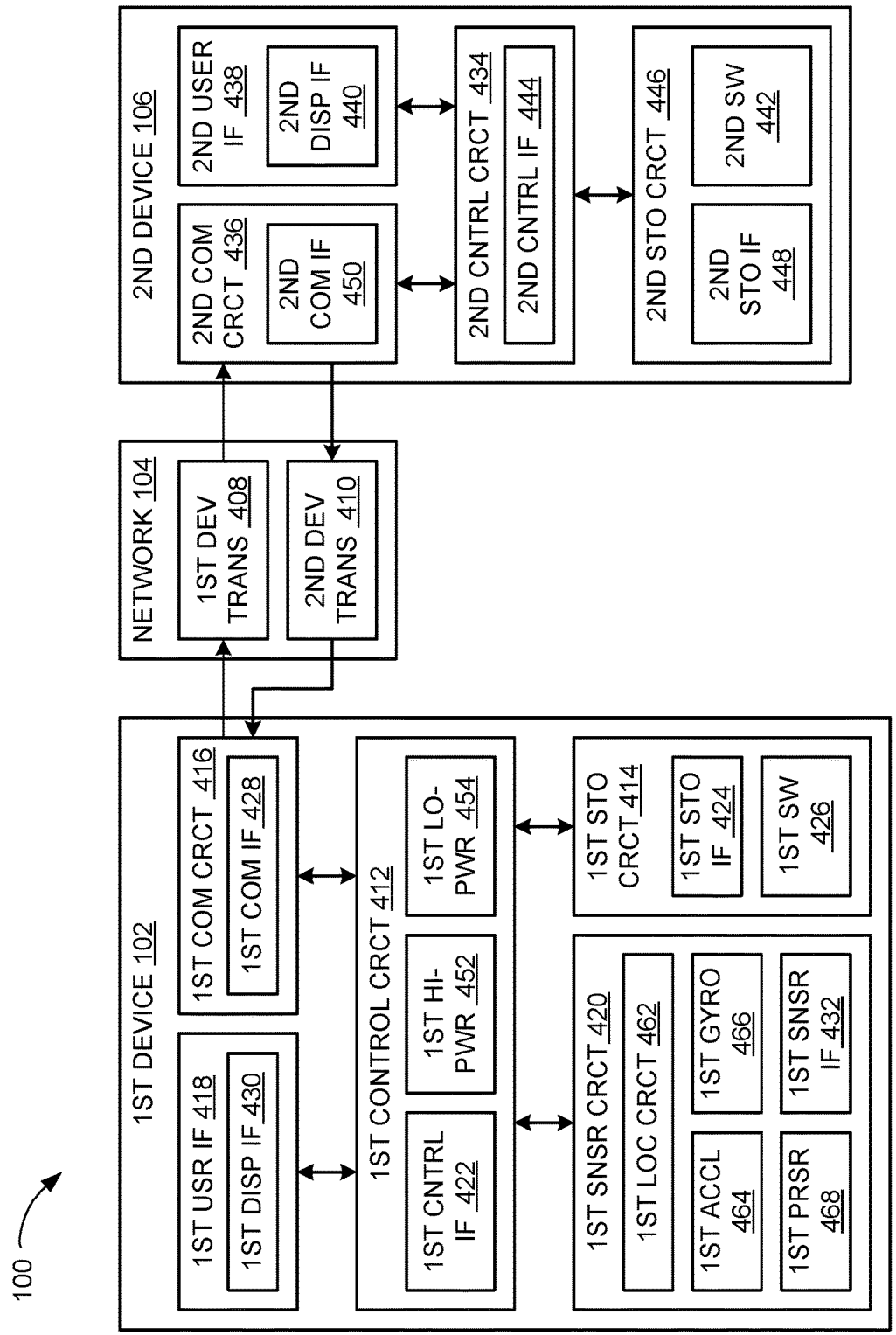
FIG. 4 is an exemplary block diagram of the computing system.

Referring now to FIG. 4 therein is shown an exemplary block diagram of the computing system 100. The computing system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the computing system 100 is shown with the first device 102 as a client device, although it is understood that the computing system 100 can have the first device 102 as a different type of device. For example, the first device 102 can be a relay device.

Also for illustrative purposes, the computing system 100 is shown with the second device 106 as a mobile device, a computing device, an appliance, or a combination thereof, although it is understood that the computing system 100 can have the second device 106 as a different type of device.

For brevity of description, in this embodiment of the present invention, the first device 102 will be described as a client device and the second device 106 will be described as a mobile device, a computing device, an appliance, a wearable device, or a combination thereof. Embodiments of the present invention are not limited to this selection for the type of devices. The selection is an example of the embodiments of the present invention.

The first device 102 can include a first control circuit 412, a first storage circuit 414, a first communication circuit 416, a first user interface 418, a first sensor circuit 420, or a combination thereof. The first control circuit 412 can include a first control interface 422. The first control circuit 412 can execute a first software 426 to provide the instructions for operation of the computing system 100. The first control circuit 412 can be implemented in a number of different manners.

For example, the first control circuit 412 can be a processor, an embedded processor, a microprocessor, a hardware control logic, a hardware finite state machine (FSM), a digital signal processor (DSP), or a combination thereof. As a more specific example, the first control circuit 412 can include a processor, an embedded processor, a microprocessor, a hardware control logic, a hardware FSM, a DSP, or a combination thereof configured generally to execute or implement any software or instruction. Also as a more specific example, the first control circuit 412 can include circuitry, such as a hardware FSM, a DSP, FPGA, digital logic, or a combination thereof configured specifically in hardware to execute or implement one or more functions.

The first control interface 422 can be used for communication between the first control circuit 412 and other functional units or circuits in the first device 102. The first control interface 422 can also be used for communication that is external to the first device 102.

The first control interface 422 can receive information from the other functional units/circuits or from external sources, or can transmit information to the other functional units/circuits or to external destinations. The external sources and the external destinations refer to sources and destinations external to the first device 102.

The first control interface 422 can be implemented in different ways and can include different implementations depending on which functional units/circuits or external units/circuits are being interfaced with the first control interface 422. For example, the first control interface 422 can be implemented with a microelectromechanical system (MEMS), optical circuitry, waveguides, wireless circuitry, wireline circuitry, or a combination thereof.

The first sensor circuit 420 can generate information regarding environment or surrounding of the first device 102, location or movement of the first device 102, or a combination thereof, as example. The first sensor circuit 420 can be implemented in many ways. For example, the first sensor circuit 420 can include a first location circuit 462, a first accelerometer 464, a first gyroscope 466, a first pressure sensor 468, or a combination thereof.

The first location circuit 462 can generate a location information, a heading, a velocity, or a combination thereof for the first device 102, as examples. The first location circuit 462 can be implemented in many ways. For example, the first location circuit 462 can function as at least a part of a global positioning system (GPS), an inertial navigation system such as a magnetometer, a compass, a spectrum analyzer, a beacon, a cellular-tower location system, or any combination thereof.

The first accelerometer 464 can include an instrument or a component for determining or measuring a change in a rate, a speed, a velocity, a force associated with physical displacement, or a combination thereof for the first device 102. The first accelerometer 464 can generate a degree or magnitude of acceleration, a heading, a sequence thereof, or a combination thereof. The first accelerometer 464 can be implemented in many ways. For example, the first accelerometer 464 can include or utilize an electro-mechanical circuit, piezoelectric circuit, laser or optical circuit, magnetic sensor circuitry, gyroscopic circuitry, thermal sensory circuit, or a combination thereof.

The first gyroscope 466 can include can include an instrument or a component for determining or identifying a specific direction by maintaining the specific direction regardless of the orientation of the first device 102. The first gyroscope 466 can be for determining a physical orientation of the first device 102 in three-dimensional space. The first gyroscope 466 can be implemented in many ways. For example, the first gyroscope 466 can include a MEMS gyroscope device or circuit, a ring laser gyroscope, a fiber optic gyroscope, a quantum gyroscope, a compass, or a combination thereof.

The first pressure sensor 468 can include can include an instrument or a component for determining an amount of force generated by surrounding gases or liquids on to the first device 102. The first pressure sensor 468 can include a barometer for measuring atmospheric pressure on the first device 102. For example, the first pressure sensor 468 can include a MEMS barometer, a piezo-resistive pressure-sensing circuit, or a combination thereof.

For illustrative purposes, the first sensor circuit 420 has been described with the first location circuit 462, the first accelerometer 464, the first gyroscope 466, and the first pressure sensor 468 as separate circuits or units. However, the first sensor circuit 420 can include combinational circuits or units. For example, the first location circuit 462 can include the first accelerometer 464, the first gyroscope 466, the first pressure sensor 468, or a combination thereof. Also for example, the first accelerometer 464 can include the first gyroscope 466, the first pressure sensor 468, or a combination thereof.

The first sensor circuit 420 can include a first sensor interface 432. The first sensor interface 432 can be used for communication between the first sensor circuit 420 and other functional units or circuits in the first device 102. The first sensor interface 432 can also be used for communication that is external to the first device 102.

The first sensor interface 432 can receive information from the other functional units/circuits or from external sources, or can transmit information to the other functional units/circuits or to external destinations. The external sources and the external destinations refer to sources and destinations external to the first device 102.

The first sensor interface 432 can include different implementations depending on which functional units/circuits or external units/circuits are being interfaced with the first sensor circuit 420. The first sensor interface 432 can be implemented with technologies and techniques similar to the implementation of the first control interface 422.

The first storage circuit 414 can store the first software 426. The first storage circuit 414 can also store relevant information, such as advertisements, biometric information, points of interest (POIs), navigation routing entries, reviews/ratings, feedback, or any combination thereof.

The first storage circuit 414 can be a volatile memory, a nonvolatile memory, an internal memory, an external memory, or a combination thereof. For example, the first storage circuit 414 can be a nonvolatile storage such as non-volatile random access memory (NVRAM), Flash memory, disk storage, or a volatile storage such as static random access memory (SRAM).

The first storage circuit 414 can include a first storage interface 424. The first storage interface 424 can be used for communication between the first sensor circuit 420 and other functional units or circuits in the first device 102. The first storage interface 424 can also be used for communication that is external to the first device 102.

The first storage interface 424 can receive information from the other functional units/circuits or from external sources, or can transmit information to the other functional units/circuits or to external destinations. The external sources and the external destinations refer to sources and destinations external to the first device 102.

The first storage interface 424 can include different implementations depending on which functional units/circuits or external units/circuits are being interfaced with the first storage circuit 414. The first storage interface 424 can be implemented with technologies and techniques similar to the implementation of the first control interface 422.

The first storage interface 424, the first control interface 422, the first communication interface 428, the first display interface 430, the first sensor interface 432, or a combination thereof can access the first software 426 or one or more instructions therein. The various interfaces can configure the hardware circuits to implement or execute the loaded instructions.

For example, the first control circuit 412 can be configured and implement or execute the instruction in the first software 426 accessed or loaded through the first control interface 422 and the first storage interface 424. Also for example, the first communication circuit 416 can be configured or set in a specific manner according to configurations or settings stored in the first storage unit 414 and accessed by the first communication interface 428, the first storage interface 424, or a combination thereof.

The first communication circuit 416 can enable external communication to and from the first device 102. For example, the first communication circuit 416 can permit the first device 102 to communicate with the second device 106 of FIG. 1, an attachment, such as a peripheral device or a notebook computer, and the network 104.

The first communication circuit 416 can also function as a communication hub allowing the first device 102 to function as part of the network 104 and not limited to be an end point or terminal unit/circuit to the network 104. The first communication circuit 416 can include active and passive components, such as microelectronics or an antenna, for interaction with the network 104.

The first communication circuit 416 can include a first communication interface 428. The first communication interface 428 can be used for communication between the first communication circuit 416 and other functional units or circuits in the first device 102. The first communication interface 428 can receive information from the other functional units/circuits or can transmit information to the other functional units or circuits.

The first communication interface 428 can include different implementations depending on which functional units or circuits are being interfaced with the first communication circuit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a sensor, a signal generator, a microphone or any combination thereof to provide data and communication inputs.

The first user interface 418 can include a first display interface 430. The first display interface 430 can include a display, a projector, a video screen, a speaker, or any combination thereof.

The first control circuit 412 can operate the first user interface 418 to display information generated by the computing system 100. The first control circuit 412 can also execute the first software 426 for the other functions of the computing system 100, including receiving location information from the first sensor circuit 420. The first control circuit 412 can further execute the first software 426 for interaction with the network 104 via the first communication circuit 416.

The first device 102 can include and utilize a first high-power circuit 452 and a first low-power circuit 454. The first low-power circuit 454 can include circuit utilizing lower amount of energy or power than the first high-power circuit 452 for same duration of time. The first low-power circuit 454 can implement a process, a function, a feature, or a combination thereof same as, similar to, or different from the first high-power circuit 452.

For example, the first high-power circuit 452 can generate same or similar results as the first low-power circuit 454 but with higher accuracy, higher complexity, faster execution, or a combination thereof. Also for example, the first high-power circuit 452 can implement other features or processes in addition to or subsequent to the first low-power circuit 454.

For illustrative example, the first control circuit 412 is shown having the first high-power circuit 452 and the low-power circuit 454, such as for different size cores or different processors. However, it is understood that other circuits or interfaces, such as the first user interface 418, the first communication circuit 416, the first sensor circuit 420, the first storage circuit 414, or a combination thereof can include and utilize the first high-power circuit 452 and the first low-power circuit 454.

As a more specific example, the first sensor circuit 420 or the first control unit 412 can include the first low-power circuit 454 for periodically measuring or monitoring the acceleration or the location of the first device 102. The first high-power circuit 454 can further measure or monitor other types of the sensor data, the acceleration or the location with greater accuracy or frequency, other subsequent processing, or a combination thereof. The first high-power circuit 454 can be triggered or initiated based on results from the first low-power circuit 452.

Also for illustrative example, the first device 102 is shown having the first high-power circuit 452 and the low-power circuit 454. However, it is understood that the second device 106 can also include a second high-power circuit and a second low-power circuit (both not shown for brevity) similar to the first high-power circuit 452 and the low-power circuit 454.

The second device 106 can be optimized for implementing the various embodiments in a multiple device embodiment with the first device 102. The second device 106 can provide the additional or higher performance processing power compared to the first device 102. The second device 106 can include a second control circuit 434, a second communication circuit 436, and a second user interface 438.

The second user interface 438 allows the user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control circuit 434 can execute a second software 442 to provide the intelligence of the second device 106 of the computing system 100. The second software 442 can operate in conjunction with the first software 426. The second control circuit 434 can provide additional performance compared to the first control circuit 412.

The second control circuit 434 can operate the second user interface 438 to display information. The second control circuit 434 can also execute the second software 442 for the other functions of the computing system 100, including operating the second communication circuit 436 to communicate with the first device 102 over the network 104.

The second control circuit 434 can be implemented in a number of different manners. For example, the second control circuit 434 can be a processor, an embedded processor, a microprocessor, a hardware control logic, a hardware finite state machine (FSM), a digital signal processor (DSP), or a combination thereof. As a more specific example, the second control circuit 434 can include a processor, an embedded processor, a microprocessor, a hardware control logic, a hardware FSM, a DSP, or a combination thereof configured generally to execute or implement any software or instruction. Also as a more specific example, the second control circuit 434 can include circuitry, such as a hardware FSM, a DSP, FPGA, digital logic, or a combination thereof configured specifically in hardware to execute or implement one or more functions.

The second control circuit 434 can include a second controller interface 444. The second controller interface 444 can be used for communication between the second control circuit 434 and other functional units or circuits in the second device 106. The second controller interface 444 can also be used for communication that is external to the second device 106.

The second controller interface 444 can receive information from the other functional units/circuits or from external sources, or can transmit information to the other functional units/circuits or to external destinations. The external sources and the external destinations refer to sources and destinations external to the second device 106.

The second controller interface 444 can be implemented in different ways and can include different implementations depending on which functional units/circuits or external units/circuits are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage circuit 446 can store the second software 442. The second storage circuit 446 can also store the relevant information, such as advertisements, biometric information, points of interest, navigation routing entries, reviews/ratings, feedback, or any combination thereof. The second storage circuit 446 can be sized to provide the additional storage capacity to supplement the first storage circuit 414.

For illustrative purposes, the second storage circuit 446 is shown as a single element, although it is understood that the second storage circuit 446 can be a distribution of storage elements. Also for illustrative purposes, the computing system 100 is shown with the second storage circuit 446 as a single hierarchy storage system, although it is understood that the computing system 100 can have the second storage circuit 446 in a different configuration. For example, the second storage circuit 446 can be formed with different storage technologies forming a memory hierarchal system including different levels of caching, main memory, rotating media, or off-line storage.

The second storage circuit 446 can be a volatile memory, a nonvolatile memory, an internal memory, an external memory, or a combination thereof. For example, the second storage circuit 446 can be a nonvolatile storage such as non-volatile random access memory (NVRAM), Flash memory, disk storage, or a volatile storage such as static random access memory (SRAM).

The second storage circuit 446 can include a second storage interface 448. The second storage interface 448 can be used for communication between the first sensor circuit 420 and other functional units or circuits in the second device 106. The second storage interface 448 can also be used for communication that is external to the second device 106.

The second storage interface 448 can receive information from the other functional units/circuits or from external sources, or can transmit information to the other functional units/circuits or to external destinations. The external sources and the external destinations refer to sources and destinations external to the second device 106.

The second storage interface 448 can include different implementations depending on which functional units/circuits or external units/circuits are being interfaced with the second storage circuit 446. The second storage interface 448 can be implemented with technologies and techniques similar to the implementation of the second controller interface 444.

The second storage interface 448, the second control interface 444, the second communication interface 450, the second display interface 440, or a combination thereof can access the second software 442 or one or more instructions therein. The various interfaces can configure the hardware circuits to implement or execute the loaded instructions.

For example, the second control circuit 434 can be configured and implement or execute the instruction in the second software 442 accessed or loaded through the second control interface 444 and the second storage interface 448. Also for example, the second communication circuit 436 can be configured or set in a specific manner according to configurations or settings stored in the second storage unit 446 and accessed by the second communication interface 436, the second storage interface 448, or a combination thereof.

The second communication circuit 436 can enable external communication to and from the second device 106. For example, the second communication circuit 436 can permit the second device 106 to communicate with the first device 102 over the network 104.

The second communication circuit 436 can also function as a communication hub allowing the second device 106 to function as part of the network 104 and not limited to be an end point or terminal unit/circuit to the network 104. The second communication circuit 436 can include active and passive components, such as microelectronics or an antenna, for interaction with the network 104.

The second communication circuit 436 can include a second communication interface 450. The second communication interface 450 can be used for communication between the second communication circuit 436 and other functional units or circuits in the second device 106. The second communication interface 450 can receive information from the other functional units/circuits or can transmit information to the other functional units or circuits.

The second communication interface 450 can include different implementations depending on which functional units or circuits are being interfaced with the second communication circuit 436. The second communication interface 450 can be implemented with technologies and techniques similar to the implementation of the second controller interface 444.

The first communication circuit 416 can couple with the network 104 to send information to the second device 106 in the first device transmission 408. The second device 106 can receive information in the second communication circuit 436 from the first device transmission 408 of the network 104.

The second communication circuit 436 can couple with the network 104 to send information to the first device 102 in the second device transmission 410. The first device 102 can receive information in the first communication circuit 416 from the second device transmission 410 of the network 104. The computing system 100 can be executed by the first control circuit 412, the second control circuit 434, or a combination thereof.

For illustrative purposes, the second device 106 is shown with the partition having the second user interface 438, the second storage circuit 446, the second control circuit 434, and the second communication circuit 436, although it is understood that the second device 106 can have a different partition. For example, the second software 442 can be partitioned differently such that some or all of its function can be in the second control circuit 434 and the second communication circuit 436. Also, the second device 106 can include other functional units or circuits not shown in FIG. 4 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

For illustrative purposes, the computing system 100 is described by operation of the first device 102 and the second device 106. It is understood that the first device 102 and the second device 106 can operate any of the circuits and functions of the computing system 100. For example, the first device 102 is described to operate the first sensor circuit 420, although it is understood that the second device 106 can also operate the first sensor circuit 420.

Figure 5:
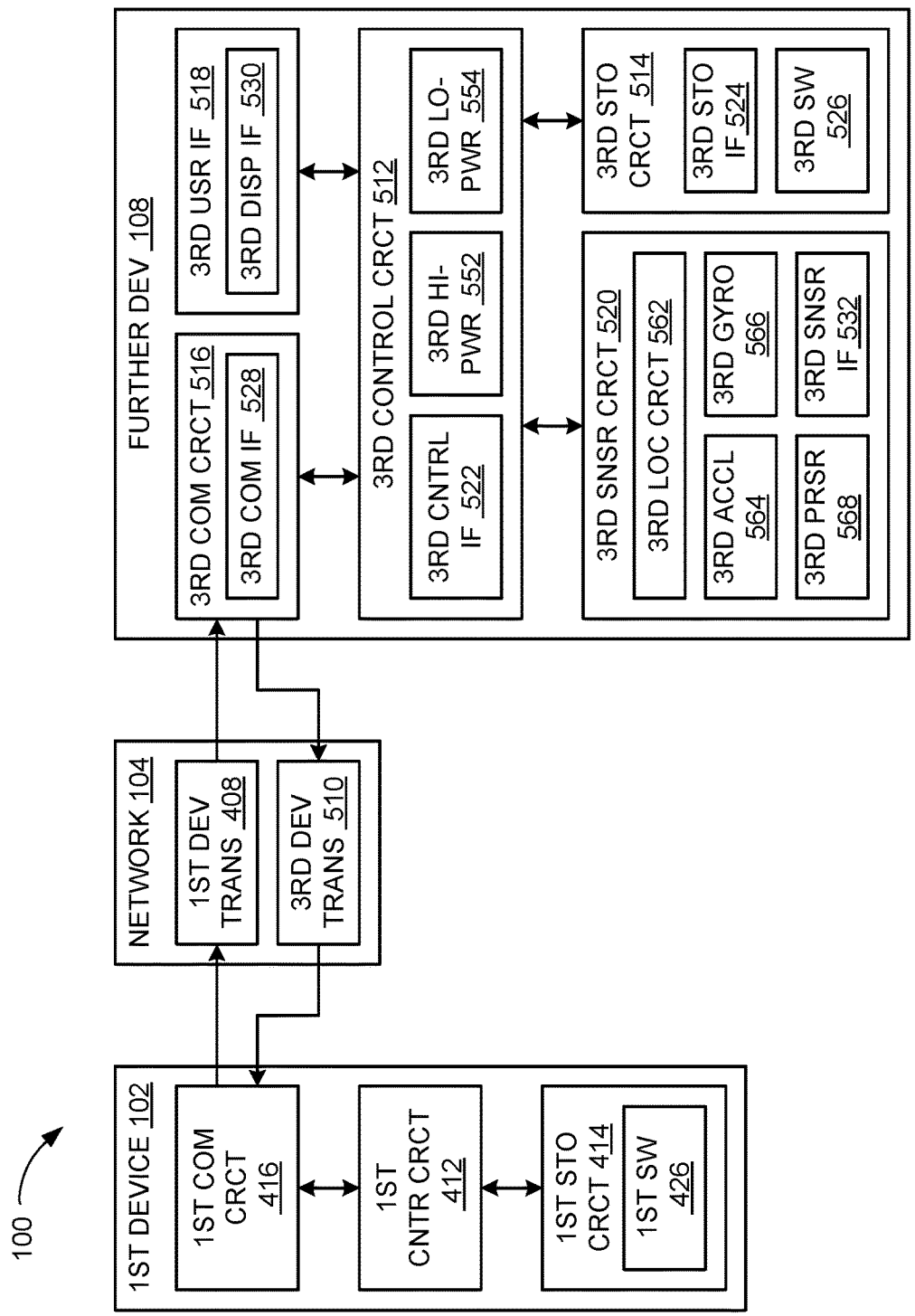
FIG. 5 is a further exemplary block diagram of the computing system.

Referring now to FIG. 5, therein is shown a further exemplary block diagram of the computing system 100. Along with the first device 102 and the second device 106 of FIG. 4, the computing system 100 can include the further device 108. The first device 102 can send information in the first device transmission 408 over the network 104 to the further device 108. The further device 108 can send information in a third device transmission 510 over the network 104 to the first device 102, the second device 106, or a combination thereof.

For illustrative purposes, the computing system 100 is shown with the further device 108 as a client device, although it is understood that the computing system 100 can have the further device 108 as a different type of device. For example, the further device 108 can be a server.

Also for illustrative purposes, the computing system 100 is shown with the first device 102 communicating with the further device 108. However, it is understood that the second device 106, or a combination thereof can also communicate with the further device 108 in a similar manner as the communication between the first device 102 and the second device 106.

For brevity of description in this embodiment of the present invention, the further device 108 will be described as a client device. The embodiment of the present invention is not limited to this type of devices. The selection is an example of an embodiment of the present invention.

The further device 108 can be optimized for implementing an embodiment of the present invention in a multiple device or multiple user embodiments with the first device 102. The further device 108 can provide the additional or specific functions compared to the first device 102, the second device 106, or a combination thereof. The further device 108 can further be a device owned or used by a separate user different from the user of the first device 102.

The further device 108 can include a third control circuit 512, a third storage circuit 514, a third communication circuit 516, a third user interface 518, a third sensor circuit 520, or a combination thereof. The third control circuit 512 can include a third control interface 522. The third control circuit 512 can execute a third software 526 to provide the instructions for operation of the computing system 100.

The third control circuit 512 can be implemented in a number of different manners. For example, the third control circuit 512 can be a processor, an application specific integrated circuit (ASIC) an embedded processor, a microprocessor, a hardware control logic, a hardware finite state machine (FSM), a digital signal processor (DSP), or a combination thereof. As a more specific example, the third control circuit 512 can include a processor, an embedded processor, a microprocessor, a hardware control logic, a hardware FSM, a DSP, or a combination thereof configured generally to execute or implement any software or instruction. Also as a more specific example, the third control circuit 512 can include circuitry, such as a hardware FSM, a DSP, FPGA, digital logic, or a combination thereof configured specifically in hardware to execute or implement one or more functions.

The third control interface 522 can be used for communication between the third control circuit 512 and other functional units or circuits in the further device 108. The third control interface 522 can also be used for communication that is external to the further device 108.

The third control interface 522 can receive information from the other functional units/circuits or from external sources, or can transmit information to the other functional units/circuits or to external destinations. The external sources and the external destinations refer to sources and destinations external to the further device 108.

The third control interface 522 can be implemented in different ways and can include different implementations depending on which functional units/circuits or external units/circuits are being interfaced with the third control interface 522. For example, the third control interface 522 can be implemented with a microelectromechanical system (MEMS), optical circuitry, waveguides, wireless circuitry, wireline circuitry, or a combination thereof.

The third storage circuit 514 can store the third software 526. The third storage circuit 514 can also store the relevant information, such as data representing incoming images, data representing previously presented image, sound files, or a combination thereof.

The third storage circuit 514 can be a volatile memory, a nonvolatile memory, an internal memory, an external memory, or a combination thereof. For example, the third storage circuit 514 can be a nonvolatile storage such as non-volatile random access memory (NVRAM), Flash memory, disk storage, or a volatile storage such as static random access memory (SRAM). Also for example, the third storage circuit 514 can be distribution of storage elements, multiple hierarchy storage system including different levels of caching, main memory, rotating media, or off-line storage, or a combination thereof.

The third storage circuit 514 can include a third storage interface 524. The third storage interface 524 can be used for communication between the third storage circuit 514 and other functional units or circuits in the further device 108. The third storage interface 524 can also be used for communication that is external to the further device 108.

The third storage interface 524 can receive information from the other functional units/circuits or from external sources, or can transmit information to the other functional units/circuits or to external destinations. The external sources and the external destinations refer to sources and destinations external to the further device 108.

The third storage interface 524 can include different implementations depending on which functional units/circuits or external units/circuits are being interfaced with the third storage circuit 514. The third storage interface 524 can be implemented with technologies and techniques similar to the implementation of the third control interface 522.

The third storage interface 524, the third control interface 522, the third communication interface 528, the third display interface 530, a third sensor interface 532, or a combination thereof can access the third software 526 or one or more instructions therein. The various interfaces can configure the hardware circuits to implement or execute the loaded instructions.

For example, the third control circuit 512 can be configured and implement or execute the instruction in the third software 526 accessed or loaded through the third control interface 522 and the third storage interface 524. Also for example, the third communication circuit 516 can be configured or set in a specific manner according to configurations or settings stored in the third storage unit 514 and accessed by the third communication interface 528, the third storage interface 524, or a combination thereof.

The third communication circuit 516 can enable external communication to and from the further device 108. For example, the third communication circuit 516 can permit the further device 108 to communicate with the second device 106, the first device 102, a different device, an attachment, such as a peripheral device or a desktop computer, the network 104, or a combination thereof.

The third communication circuit 516 can also function as a communication hub allowing the further device 108 to function as part of the network 104 and not limited to be an end point or terminal unit to the network 104. The third communication circuit 516 can include active and passive components, such as microelectronics or an antenna, for interaction with the network 104.

The third communication circuit 516 can include a baseband device or component, a modem, a digital signal processor, or a combination thereof for transmitting, formatting, receiving, detecting, decoding, further processing, or a combination thereof for communication signals. The third communication circuit 516 can include one or more portions for processing the voltages, the currents, the digital information, or a combination thereof, such as an analog-to-digital converter, a digital-to-analog converter, a filter, an amplifier, a processor-type circuitry, or a combination thereof. The third communication circuit 516 can further include one or more portions for storing information, such as cache or RAM memory, registers, or a combination thereof.

The third communication circuit 516 can include a third communication interface 528. The third communication interface 528 can be used for communication between the third communication circuit 516 and other functional units or circuits in the further device 108. The third communication interface 528 can receive information from the other functional units/circuits or can transmit information to the other functional units or circuits.

The third communication interface 528 can include different implementations depending on which functional units or circuits are being interfaced with the third communication circuit 516. The third communication interface 528 can be implemented with technologies and techniques similar to the implementation of the third control interface 522.

The third user interface 518 allows a user (not shown) to interface and interact with the further device 108. The third user interface 518 can include an input device and an output device. Examples of the input device of the third user interface 518 can include a keypad, a touchpad, soft-keys, a keyboard, a microphone, an infrared sensor for receiving remote signals, or any combination thereof to provide data and communication inputs.

The third user interface 518 can include a third display interface 530. The third display interface 530 can include an output device. The third display interface 530 can include a display, a projector, a video screen, a speaker, or any combination thereof.

The third control circuit 512 can operate the third user interface 518 to display information generated by the computing system 100. The third control circuit 512 can also execute the third software 526 for the other functions of the computing system 100, including receiving location information from the third sensor circuit 520. The third control circuit 512 can further execute the third software 526 for interaction with the network 104 via the third communication circuit 516.

The third sensor circuit 520 can generate information regarding environment or surrounding of the further device 108, location or movement of the further device 108, or a combination thereof, as example. The third sensor circuit 520 can be implemented in many ways. For example, the third sensor circuit 520 can include a third location circuit 562, a third accelerometer 564, a third gyroscope 566, a third pressure sensor 568, or a combination thereof.

The third location circuit 562 can generate a location information, a heading, a velocity, or a combination thereof for the third device 108, as examples. The third location circuit 562 can be implemented in many ways. For example, the third location circuit 562 can function as at least a part of a global positioning system (GPS), an inertial navigation system such as a magnetometer, a compass, a spectrum analyzer, a beacon, a cellular-tower location system, or any combination thereof.

The third accelerometer 564 can include an instrument or a component for determining or measuring a change in a rate, a speed, a velocity, a force associated with physical displacement, or a combination thereof for the third device 108. The third accelerometer 564 can generate a degree or magnitude of acceleration, a heading, a sequence thereof, or a combination thereof. The third accelerometer 564 can be implemented in many ways. For example, the third accelerometer 564 can include or utilize an electro-mechanical circuit, piezoelectric circuit, laser or optical circuit, magnetic sensor circuitry, gyroscopic circuitry, thermal sensory circuit, or a combination thereof.

The third gyroscope 566 can include can include an instrument or a component for determining or identifying a specific direction by maintaining the specific direction regardless of the orientation of the third device 108. The third gyroscope 566 can be for determining a physical orientation of the third device 108 in three-dimensional space. The third gyroscope 566 can be implemented in many ways. For example, the third gyroscope 566 can include a MEMS gyroscope device or circuit, a ring laser gyroscope, a fiber optic gyroscope, a quantum gyroscope, a compass, or a combination thereof.

The third pressure sensor 568 can include can include an instrument or a component for determining an amount of force generated by surrounding gases or liquids on to the third device 108. The third pressure sensor 568 can include a barometer for measuring atmospheric pressure on the third device 108. For example, the third pressure sensor 568 can include a MEMS barometer, a piezo-resistive pressure-sensing circuit, or a combination thereof.

For illustrative purposes, the third sensor circuit 520 has been described with the third location circuit 562, the third accelerometer 564, the third gyroscope 566, and the third pressure sensor 568 as separate circuits or units. However, the third sensor circuit 520 can include combinational circuits or units. For example, the third location circuit 562 can include the third accelerometer 564, the third gyroscope 566, the third pressure sensor 568, or a combination thereof. Also for example, the third accelerometer 564 can include the third gyroscope 566, the third pressure sensor 568, or a combination thereof.

The third sensor circuit 520 can include the third sensor interface 532. The third sensor interface 532 can be used for communication between the third sensor circuit 520 and other functional units or circuits in the further device 108. The third sensor interface 532 can also be used for communication external to the further device 108.

The third sensor interface 532 can receive information from the other functional units/circuits or from external sources, or can transmit information to the other functional units/circuits or to external destinations. The external sources and the external destinations refer to sources and destinations external to the further device 108.

The third sensor interface 532 can include different implementations depending on which functional units/circuits or external units/circuits are being interfaced with the third location circuit 520. The third sensor interface 532 can be implemented with technologies and techniques similar to the implementation of the third control circuit 512.

The further device 108 can include and utilize a third high-power circuit 552 and a third low-power circuit 554. The third low-power circuit 554 can include circuit utilizing lower amount of energy or power than the third high-power circuit 552 for same duration of time. The third low-power circuit 554 can implement a process, a function, a feature, or a combination thereof same, similar, or different than the third high-power circuit 552.

For example, the third high-power circuit 552 can generate same or similar results as the third low-power circuit 554 but with higher accuracy, higher complexity, faster execution, or a combination thereof. Also for example, the third high-power circuit 552 can implement other features or processes in addition to or subsequent to the third low-power circuit 554.

For illustrative example, the third control circuit 512 is shown having the third high-power circuit 552 and the third low-power circuit 554, such as for different size cores or different processors. However, it is understood that other circuits or interfaces, such as the third user interface 518, the third communication circuit 516, the third sensor circuit 520, the third storage circuit 514, or a combination thereof can include and utilize the third high-power circuit 552 and the third low-power circuit 554.

As a more specific example, the third sensor circuit 520 or the third control unit 512 can include the third low-power circuit 554 for periodically measuring or monitoring the acceleration or the location of the further device 108. The third high-power circuit 554 can further measure or monitor other types of the sensor data, the acceleration or the location with greater accuracy or frequency, other subsequent processing, or a combination thereof. The third high-power circuit 554 can be triggered or initiated based on results from the third low-power circuit 552.

Also for illustrative purposes, the further device 108 is shown with the partition having the third user interface 518, the third storage circuit 514, the third control circuit 512, and the third communication circuit 516, although it is understood that the further device 108 can have a different partition. For example, the third software 526 can be partitioned differently such that some or all of its function can be in the third control circuit 512 and the third communication circuit 516. Also, the further device 108 can include other functional units or circuits not shown in FIG. 5 for clarity.

The functional units or circuits in the further device 108 can work individually and independently of the other functional units or circuits. The further device 108 can work individually and independently from the first device 102, the second device 106, and the network 104.

For illustrative purposes, the computing system 100 is described by operation of the first device 102 and the further device 108. It is understood that the first device 102, the second device 106, and the further device 108 can operate any of the circuits and functions of the computing system 100.

Figure 6:
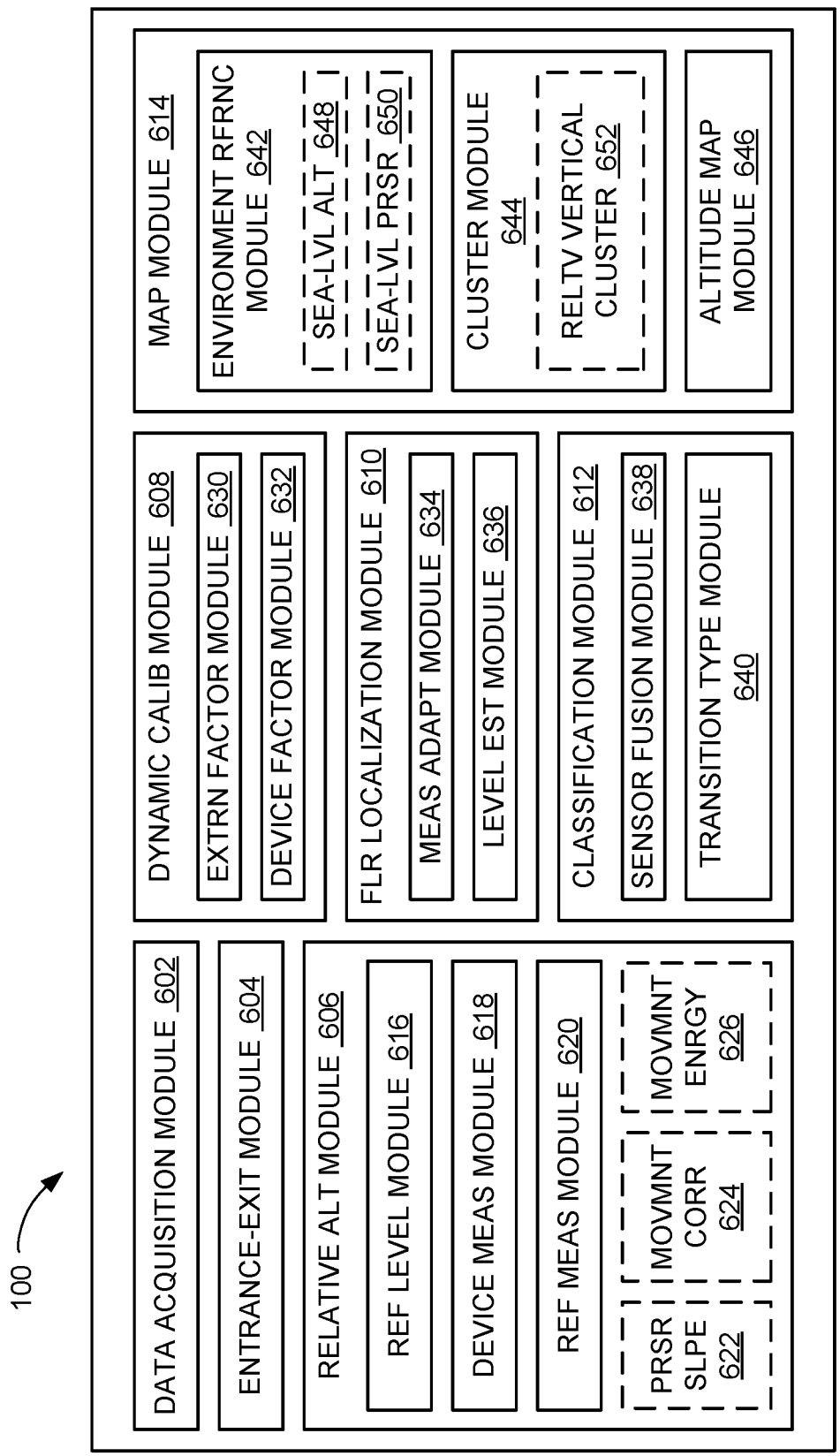
FIG. 6 is an exemplary system architecture for the computing system.

Referring now to FIG. 6, therein is shown an exemplary system architecture for the computing system 100. The computing system 100 can include a data acquisition module 602, an entrance-exit module 604, a relative altitude module 606, a dynamic calibration module 608, a floor localization module 610, a classification module 612, a map module 614, or a combination thereof.

The term "module" referred to herein can include or be implemented as software, hardware, or a combination thereof in the present invention in accordance with the context in which the term is used. For example, the software can be or include machine code, firmware, embedded code, and application software. The software can also include a function, a call to a function, a code block, or a combination thereof. Also for example, the hardware can be or include gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof to control one or more of the hardware units or circuits.

As a more specific example, one or more of the modules can include or be implemented with one or more of the circuits in FIG. 4 or FIG. 5, the first software 426 of FIG. 4, the second software 442 of FIG. 4, the third software 526 of FIG. 5, a portion therein, or a combination thereof. The modules can be implemented with the first device 102 of FIG. 1, the second device 106 of FIG. 1, the further device 108 of FIG. 1, or a combination thereof.

One or more of the modules can be coupled to each other, either directly or indirectly. For example, the modules can be indirectly coupled to each other by having one or more of inputs, outputs, triggers, function calls, or a combination of one module connected to inputs, outputs, triggers, function calls, or a combination of another module through a further module or structure.

Also for example, the modules can be directly coupled to each other by having one or more of inputs, outputs, triggers, function calls, or a combination for one module directly connected, without any intervening modules or structures, to inputs, outputs, triggers, function calls, or a combination of another corresponding module. As a more specific example, the modules can be directly coupled using a conductor, a wireless connection, a function call, a register, a flag, a program counter sequence, or a combination thereof.

The data acquisition module 602 is configured to collect sensor data. The data acquisition module 602 can determine or identify the environment measurement 228 of FIG. 2, the movement measurement 234 of FIG. 2, the device location 236 of FIG. 2, or a combination thereof for the first device 102, the further device 108, or a combination thereof.

The data acquisition module 602 can use the first sensor circuit 420 of FIG. 4, the second sensor circuit 520 of FIG. 5, or a combination thereof to determine or identify the sensor data. For example, the data acquisition module 602 can use the first location circuit 462 of FIG. 4, the third location circuit 562 of FIG. 5, or a combination thereof to determine the device location 236, the device altitude 232 of FIG. 2, or a combination thereof.

Also for example, the data acquisition module 602 can use the first accelerometer 464 of FIG. 4, the third accelerometer 564 of FIG. 5, the first location circuit 462, the third location circuit 562, or a combination thereof to determine the movement measurement 234. Also for example, the data acquisition module 602 can use the first control circuit 412 of FIG. 4, the second control circuit 434 of FIG. 4, the third control circuit 512 of FIG. 5, or a combination thereof to process the movement measurement 234 to implement dead-reckoning process and determine or calculate the device location 236, the device altitude 232, or a combination thereof.

Also for example, the data acquisition module 602 can use the first gyroscope 466 of FIG. 4, the second gyroscope 566 of FIG. 5, or a combination thereof to determine an orientation of the first device 102, the further device 108, or a combination thereof, adjust or map the movement measurement 234 or a component therein to a reference direction, such as vertical or horizontal, or a combination thereof. Also for example, the data acquisition module 602 can use the first pressure sensor 468 of FIG. 4, the third pressure sensor 568 of FIG. 5, or a combination thereof to determine the pressure measurement 230 of FIG. 2.

Also for example, the data acquisition module 602 can use the first low-power circuit 454 of FIG. 4, the first high-power circuit 452 of FIG. 4, the third low-power circuit 554 of FIG. 5, the third high-power circuit 552 of FIG. 2, or a combination thereof to determine or process the sensor data. The data acquisition module 602 can use one or more of the low-power circuits to trigger or initiate one or more of the high-power circuits.

The data acquisition module 602 can use the first communication circuit 416 of FIG. 4, the second communication circuit 436 of FIG. 4, the third communication circuit 516 of FIG. 5, or a combination thereof to communicate the sensor data between the first device 102, the second device 106, the further device 108, or a combination thereof. The data acquisition module 602 can further store the sensor data in the first storage circuit 414 of FIG. 4, the second storage circuit 446 of FIG. 4, the third storage circuit 514 of FIG. 5, or a combination thereof.

The entrance-exit module 604 is configured to determine the entry-exit event 238 of FIG. 2. The entrance-exit module 604 can use the first control circuit 412, the second control circuit 434, the third control circuit 512, or a combination thereof to determine the entry-exit event 238, identify the structure geographic location 204 of FIG. 2, or a combination thereof.

The entrance-exit module 604 can store or access the entry-exit event 238, the structure geographic location 204, or a combination thereof using the first storage circuit 414, the second storage circuit 446, the third storage circuit 514, or a combination thereof. The entrance-exit module 604 can communicate the entry-exit event 238, the structure geographic location 204, or a combination thereof between devices using the first communication circuit 416, the second communication circuit 436, the third communication circuit 516, or a combination thereof.

The entrance-exit module 604 can determine the entry-exit event 238 based on the device location 236, the structure geographic location 204 of FIG. 2, or a combination thereof. Details regarding the determination of the entry-exit event 238 are described below.

The relative altitude module 606 is configured to calculate the relative altitude 306 of FIG. 3. The relative altitude module 606 can calculate the relative altitude 306 and process other intermediate or related information using the first control circuit 412, the second control circuit 434, the third control circuit 512, or a combination thereof.

The relative altitude module 606 can store or access the relative altitude 306 and other intermediate or related information using the first storage circuit 414, the second storage circuit 446, the third storage circuit 514, or a combination thereof. The relative altitude module 606 can communicate the relative altitude 306 or other intermediate or related information between devices using the first communication circuit 416, the second communication circuit 436, the third communication circuit 516, or a combination thereof.

The relative altitude module 606 can include a reference level module 616, a device measurement module 618, a reference measurement module 618, or a combination thereof. The reference level module 616 is configured to determine the entry-exit altitude 240 of FIG. 2. The reference measurement module 618 is configured to determine the reference measurement 318 of FIG. 3.

The device measurement module 618 is configured to determine the sensor data of the corresponding user device, such as the first device 102 or the further device 108. The device measurement module 618 can cooperate with, control, query, or a combination thereof relative to the data acquisition module 602 to determine the sensor data from the corresponding user device.

The relative altitude module 606 can calculate the relative altitude 306 based on the sensor data, the reference measurement 318, the device adjustment measure 320 of FIG. 3, the entry-exit altitude 240, the vertical change trigger 330 of FIG. 3, the vertical movement event 332 of FIG. 3, or a combination thereof. The relative altitude module 606 can further calculate the relative altitude 306 based on calculating a pressure slope 622, a movement correlation 624, a movement energy 626, or a combination thereof.

The pressure slope 622 is a relationship of or a change in the pressure measurement 230 over time as described above. The movement correlation 624 is a pattern or a relationship in or between directional components of the movement measurement 234 as described above. The movement energy 626 is an amount of energy associated with the movement of the device as described above. Details regarding the calculation of the relative altitude 306 are described below.

The dynamic calibration module 608 is configured to calibrate the corresponding user device, such as the first device 102, the further device 108, or a combination thereof. The dynamic calibration module 608 can calibrate based on calculating the device adjustment measure 320 for the first device 102, the further device 108, or a combination thereof.

The dynamic calibration module 608 can calibrate using the first control circuit 412, the second control circuit 434, the third control circuit 512, or a combination thereof. The dynamic calibration module 608 can store or access various parameters and the device adjustment measure 320 using the first storage circuit 414, the second storage circuit 446, the third storage circuit 514, or a combination thereof. The relative altitude module 606 can communicate the various parameters or the device adjustment measure 320 between devices using the first communication circuit 416, the second communication circuit 436, the third communication circuit 516, or a combination thereof.

The dynamic calibration module 608 can further determine the calibration event 312 of FIG. 3 and corresponding instance of the calibration location 310 of FIG. 3 for the calibration process. The dynamic calibration module 608 can include an external factor module 630, a device factor module 632, or a combination thereof.

The external factor module 630 is configured to determine the reference measurement 318 from a corresponding instance of the calibration location 310. The device factor module 632 is configured to determine the calibration measurement 316 of FIG. 3 corresponding to the calibration event 312. The device factor module 632 can cooperate with, control, query, or a combination thereof relative to the data acquisition module 602 to determine the sensor data for the calibration measurement 316 from the corresponding user device.

The dynamic calibration module 608 can calculate the device adjustment measure 320 based on the calibration measurement 316 and the reference measurement 318. Details regarding the calculation of the device adjustment measure 320 are described below.

The floor localization module 610 is configured to vertically locate the user device relative to the tier 210 of FIG. 2 of the building structure 202 of FIG. 2. The floor localization module 610 can vertically locate the first device 102, the further device 108, or a combination thereof within the building structure 202 based on determining the user current floor 308 of FIG. 3 corresponding to the first device 102, the further device 108, or a combination thereof within the building structure 202. The floor localization module 610 can vertically locate using an unsupervised mechanism, such as the vertical localization mechanism 302 of FIG. 3.

The floor localization module 610 can generate the internal map 206 of FIG. 2. The floor localization module 610 can further determine the user current floor 308 based on the internal map 206 of FIG. 2 of the building structure 202, the vertical profile 208 of FIG. 2 of the building structure 202, or a combination thereof. The floor localization module 610 can further include a measurement adaption module 634, a level estimation module 636, or a combination thereof.

The measurement adaption module 634 is configured to normalize the sensor data for the first device 102, the further device 108, or a combination thereof. The normalization can account for changes in the sensor data based on or influenced by weather conditions.

The level estimation module 636 is configured to use the normalized measurement to determine the user current floor 308. Details regarding determination of the user current floor 308 are described below.

The classification module 612 is configured to identify connecting mechanisms between tiers within the building structure 202. The classification module 612 can determine the tier-change access location 216 of FIG. 2, the tier-change type 218 of FIG. 2, or a combination thereof. The classification module 612 can include a sensor fusion module 638, a transition type module 640, or a combination thereof.

The sensor fusion module 638 is configured to process the sensor data. The sensor fusion module 638 can process the environment measurement 228 of FIG. 2, the movement measurement 234 of FIG. 2, the device location 236, or a combination thereof.

For example, the sensor fusion module 638 can combine the sensor data from one or more of the accelerometer circuit, one or more of the gyroscope, one or more of the pressure sensor, one or more of the location sensor circuit, or a combination thereof. As a more specific example, the sensor fusion module 638 can use readings from one circuit to trigger or initiate another circuit, orient or map measurements to a reference location, or a combination thereof.

The transition type module 640 is configured to determine the tier-change access location 216, the tier-change type 218, or a combination thereof. The transition type module 640 can determine the tier-change access location 216, the tier-change type 218, or a combination thereof based on determining the vertical movement event 332 of FIG. 3.

The transition type module 640 can further determine the tier-change access location 216, the tier-change type 218, or a combination thereof based on the sensor data, the vertical movement set 322 of FIG. 3, the pressure slope 622, the movement correlation 624, the movement energy 626, or a combination thereof. Details regarding determination of the tier-change access location 216, the tier-change type 218, or a combination thereof are described below.

The map module 614 is configured to map the insides of the building structure. The map module 614 can map the inside along the vertical direction. The map module 614 can map by generating the internal map 206 of the building structure 202, the vertical profile 208 of the building structure 202, or a combination thereof.

The map module 614 can map using an unsupervised mechanism, such as the tier mapping mechanism 226 of FIG. 2. The map module 614 can use the sensor data, the relative altitude 306, or a combination thereof to generate the internal map 206, the vertical profile 208, or a combination thereof. The map module 614 can include an environment reference module 642, a cluster module 644, an altitude mapping module 646, or a combination thereof.

The environment reference module 642 is configured to determine the reference measurement 318. The environment reference module 642 can determine the reference measurement 318 for adjusting or normalizing the sensor data. For example, the environment reference module 642 can determine the reference measurement 318 at the calibration location 310.

Also for example, the environment reference module 642 can determine the reference measurement 318 including a sea-level altitude 648, a sea-level pressure 650, or a combination thereof. The sea-level altitude 648 can include a reference height at sea-level. The sea-level pressure 650 can include a barometric reading at the sea-level.

The cluster module 644 is configured to determine one or more groupings of data. The cluster module 644 can determine a relative vertical cluster 652. The relative vertical cluster 652 is a grouping of vertical readings corresponding to user devices within the building structure 202. The relative vertical cluster 652 can be organized for each venue or each instance of the building structure 202. The venues or each instance of the building structure 202 can be recognized as clusters according to geo-location inputs.

The relative vertical cluster 652 can include one or more groupings of normalized instances of the sensor data. For example, the relative vertical cluster 652 can include a grouping of the pressure measurement 230, the device altitude 232, the reference measurement 318 corresponding to the sensor data, the relative altitude 306, or a combination thereof.

The cluster module 644 can determine the relative vertical cluster 652 in a variety of ways. For example, the cluster module 644 can include a threshold, a range, or a combination thereof for a quantity of data, a variance in the data, a pattern of the data, or a combination thereof for determining the relative vertical cluster 652. Also for example, the cluster module 644 can utilize a machine learning mechanism, a pattern analysis mechanism, a statistical analysis mechanism, or a combination thereof to determine the relative vertical cluster 652. As a more specific example, the cluster module 644 cluster based on similarity using DBScan clustering or Kernel density estimation clustering.

The altitude mapping module 646 is configured to vertically locate one or more instances of the tier 210 within the building structure 202. The altitude mapping module 646 can vertically locate for generating the internal map 206, the vertical profile 208, or a combination thereof. The altitude mapping module 646 can vertically locate using the relative vertical cluster 652.

Details regarding the function, the operation, the process, the method, or a combination for the various modules, including the map module 614 are discussed below. Further, details regarding an order, a sequence, an interaction, or a combination thereof for the function, the operation, the process, the method, or a combination are discussed below.

Figure 7:
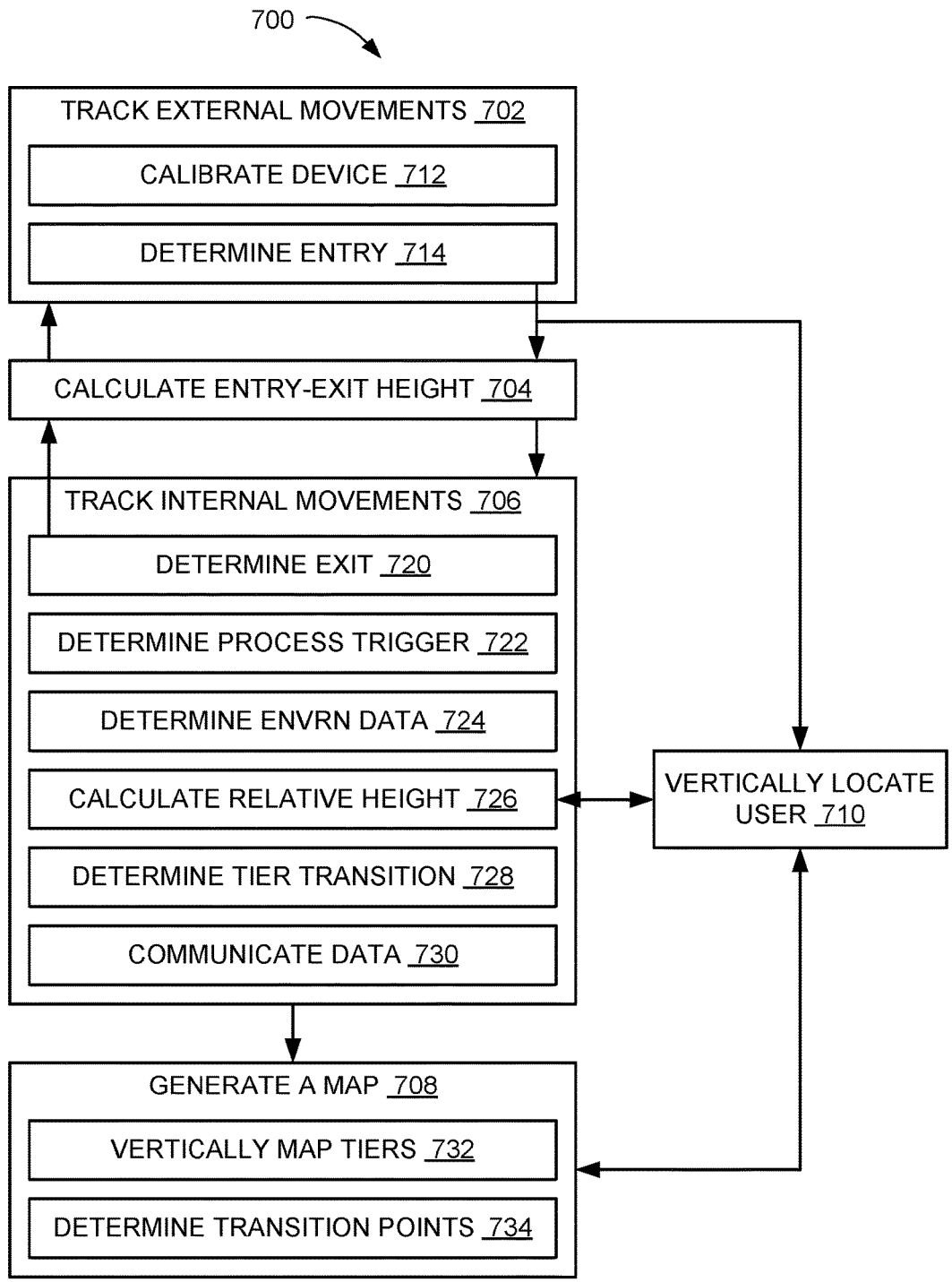
FIG. 7 is an exemplary flow chart for representing the computing system of FIG. 1.

Referring now to FIG. 7, therein is shown an exemplary flow chart 700 for representing operation of the computing system 100 of FIG. 1. The computing system 100 can utilize one or more of the user interfaces, communication circuits, control circuits, sensor circuits, storage circuits, or a combination thereof, as illustrated in FIG. 4 or FIG. 5 and described above, to implement one or more functions, instructions, steps, or a combination thereof described below.

For example, the computing system 100 can use the first user interface 418 of FIG. 4, the second user interface 438 of FIG. 4, the third user interface 518 of FIG. 5, the first communication circuit 416 of FIG. 4, the second communication circuit 436 of FIG. 4, the third communication circuit 516 of FIG. 5, the first control circuit 412 of FIG. 4, the second control circuit 434 of FIG. 4, the third control circuit 512 of FIG. 5, the first sensor circuit 420 of FIG. 4, the third sensor circuit 520 of FIG. 5, the first storage unit 414 of FIG. 4, the second storage unit 446 of FIG. 4, the third storage unit 514 of FIG. 5, or a combination thereof to implement the first software 426 of FIG. 4, the second software 442 of FIG. 4, the third software 526 of FIG. 5, or a combination thereof. The first software 426, the second software 442, the third software 526, or a combination thereof can include the functions, the instructions, the steps, or a combination thereof described below.

The computing system 100 can include the functions, the instructions, the steps, or a combination thereof for tracking external movements in a step 702, calculating an entry or exit height in a step 704, tracking internal movements in a step 706, generating a map in a step 708, vertically locating a user in a step 710, or a combination thereof. The computing system 100 can utilize the functions, the instructions, the steps, or a combination thereof to map insides of one or more instances of the building structure 202 of FIG. 2, vertically map insides of the building structure 202, locate the system user 110 of FIG. 1 or the further user 112 of FIG. 1 relative to a specific instance of the tier 210 of FIG. 2 within the building structure 202, or a combination thereof.

The computing system 100 can track external movements of the system user 110, the further user 112, or a combination thereof as represented in the step 702. The computing system 100 can track external movements based on determining the device location 236 of FIG. 2 for the first device 102 of FIG. 1, the further device 108 of FIG. 1, or a combination thereof corresponding to the system user 110, the further user 112, or a combination thereof.

The computing system 100 can determine the device location 236 for locating the first device 102, the further device 108, or a combination thereof outside of the building structure 202. The computing system 100 can use or implement the data acquisition module 602 of FIG. 6 to determine the device location 236.

The computing system 100 can determine the device location 236 using one or more of the sensor circuits, one or more of the communication circuits, one or more of the control circuits, or a combination thereof. For example, the device location 236 can be based on GPS or latitude-longitude coordinates determined by one or more of the sensor circuits. The device location 236 can be communicated between the first device 102, the second device 106 of FIG. 1, the further device 108, or a combination thereof using one or more of the communication circuits.

Also for example, the device location 236 can be based on implementing a dead-reckoning process with acceleration data from one or more of the sensor circuits including accelerometers. The computing system 100 can use one or more of the control circuits to implement or execute the dead-reckoning process. The computing system 100 can determine the device location 236 as the output of the dead-reckoning process.

Also for example, the device location 236 can be based on implementing a triangulation process with received wireless signals. The computing system 100 can receive signals, such as from a cell tower or a wireless router, using one or more of the communication circuits. The communication system 100 can process multiple signals using sender information, received time, or a combination thereof using one or more of the communication circuits, one or more of the control circuits, or a combination thereof to locate the receiving device. The location of the receiving device can be determined to be the device location 236.

The computing system 100 can implement additional processes based on tracking the external movements. For example, the computing system 100 can calibrate the device in a step 712. The computing system 100 can use or implement the dynamic calibration module 608 of FIG. 6 to calibrate the device.

The computing system 100 can calibrate the device based on determining the calibration event 312 of FIG. 3 based on identifying the calibration location 310 of FIG. 3, gathering necessary data, and calculating the device adjustment measure 320 of FIG. 3. Details regarding the calibration of the device in the step 712 are described below.

Also for example, the computing system 100 can implement additional processes including determining entry of the system user 110, the further user 112, or a combination thereof into the building structure 202 in step 714. The computing system 100 can determine the entry-exit event 238 of FIG. 2 based on the device location 236. The computing system 100 can use or implement the entrance-exit module 604 of FIG. 6 to determine the entry-exit event 238.

As a more specific example, the computing system 100 can determine the entry-exit event 238 based on using one or more of the control circuits to compare the device location 236 with the structure geographic location 204 of FIG. 2. The computing system 100 can determine the entry-exit event 238 representing entry into the building structure 202 when the device location 236 moves into or overlaps the structure geographic location 204. The computing system 100 can determine the entry-exit event 238 representing exit from the building structure 202 when the device location 236 moves out from or does not overlap the structure geographic location 204.

Also as a more specific example, the computing system 100 can determine the entry-exit event 238 based on status or availability of a signal, such as GPS signal or signals from specific wireless routers. The computing system 100 can use one or more of the communication circuits, one or more of the control circuits, or a combination thereof to determine availability of GPS signal, strength of signals from a wireless router and identity of transmitting router, or a combination thereof.

Continuing with the specific example, the computing system 100 can determine the entry-exit event 238 representing entry into the building structure 202 when the GPS signal corresponding to the device location 236 becomes unavailable, and determine the entry-exit event 238 representing exit from the building structure 202 when the GPS signal becomes available. The computing system 100 can determine the entry-exit event 238 representing entry into the building structure 202 when signals known or predetermined to be originated within the building structure 202 is determined at the first device 102, the further device 108, or a combination thereof with signal strength meeting or exceeding a predetermined threshold.

Based on determining the entry-exit event 238 corresponding to the system user 110, the further user 112, or a combination thereof entering the building structure 202, the computing system 100 can initiate or implement calculation of entry-exit altitude in step 704, vertical location of user in step 710, track internal movement in step 706, or a combination thereof. Details regarding vertically locating the user in step 710 and tracking internal movements in step 706 are discussed below.

The computing system 100 can calculate the entry-exit altitude in step 704 using the relative altitude module 606 of FIG. 6, the data acquisition module 602, the environment reference module 642 of FIG. 6, or a combination thereof. The computing system 100 can calculate the entry-exit altitude based on calculating the entry-exit altitude 240 of FIG. 2 associated with the entry-exit event 238.

The computing system 100 can use one or more of the control circuit, one or more of the sensors, one or more of the communication circuit, or a combination thereof to calculate the entry-exit altitude 240. Details regarding calculation of the entry-exit altitude 240 are discussed below.

The computing system 100 can further track movements of the user device within the building structure in step 706. The computing system 100 can track movements of the first device 102, the further device 108, or a combination thereof within the building structure. The computing system 100 can track movements in various directions, including across the horizontal plane, across the vertical direction, or a combination thereof.

The computing system 100 can track internal movements of the user device in a variety of ways. For example, the computing system 100 can use one or more of the control circuit, one or more of the communication circuit, one or more of the sensor circuit, or a combination thereof to determine the device location 236 within the building structure 202.

As a more specific example, the computing system 100 can use the first location circuit 462 of FIG. 4, the third location circuit 562 of FIG. 5, the first communication circuit 416, the second communication circuit 516, or a combination thereof to receive wireless signals, such as GPS signals, Wi-Fi signals, 4G LTE signals, or a combination thereof. The computing system 100 can use the first accelerometer 464, the first gyroscope 466 of FIG. 4, the third accelerometer 564, the third gyroscope 566 of FIG. 5, the first location circuit 462, the third location circuit 562, or a combination thereof to determine the movement measurement 234 of FIG. 2.

Continuing with the example, the computing system 100 can use the first location circuit 462, the third location circuit 562, the first communication circuit 416, the second communication circuit 516, the first control circuit 412, the second control circuit 434, the third control circuit 512, or a combination thereof to determine the device location 236. The computing system 100 can determine the device location 236 as by implementing GPS processing, Wi-Fi or Cell-Tower Triangulation mechanism, dead-reckoning mechanism, or a combination thereof to process the received signals, the movement measurement 234, or a combination thereof. The computing system 100 can use the first communication circuit 416, the second communication circuit 516, or a combination thereof to communicate the device location 236, the received signal or a description thereof, the movement measurement 234, a processing result, or a combination thereof between devices.

The computing system 100 can implement additional processes based on tracing the internal movements. For example, the computing system 100 can determine exit from the building in a step 720, determine a process trigger in a step 722, determine environmental data in a step 724, calculate relative height in a step 726, determine tier transition in a step 728, communicate data in a step 730, or a combination thereof.

The computing system 100 can determine the system user 110, the further user 112, or a combination thereof exiting the building structure 202 in the step 720. The computing system 100 can determine the entry-exit event 238 corresponding to the first device 102, the further device 108, or a combination thereof exiting from the building structure 202.

The computing system 100 can determine the entry-exit event 238 similar to the step 714 but for exiting instead of entering the building structure 202. For example, the computing system 100 can determine the entry-exit event 238 based on the device location 236. The computing system 100 can use or implement the entrance-exit module 604 to determine the entry-exit event 238.

As a more specific example, the computing system 100 can determine the entry-exit event 238 based on using one or more of the control circuits to compare the device location 236 with the structure geographic location 204. Also as a more specific example, the computing system 100 can determine the entry-exit event 238 based on status or availability of a signal, such as GPS signals becoming available upon exit from the building structure 202, degradation or loss of Wi-Fi signal from a specific router, or a combination thereof.

Based on determining the entry-exit event 238 corresponding to the system user 110, the further user 112, or a combination thereof exiting the building structure 202, the computing system 100 can initiate or implement the calculate entry-exit altitude in the step 704, track external movements 702, or a combination thereof. The determine exit step 720 can function as a break condition or an ending requirement for the track internal movements step 706.

The computing system 100 can determine the process trigger in the step 722 based on or while tracking the internal movements in the step 706. The computing system 100 can use or implement the relative altitude module 606, the data acquisition module 602, or a combination thereof to determine the process trigger.

The computing system 100 can determine the process trigger by determining the movement measurement 234. The computing system 100 can use one or more of the control circuits, one or more of the sensor circuits, one or more of the communication circuits, or a combination thereof to determine the movement measurement 234 for the first device 102, the further device 108, or a combination thereof.

The computing system 100 can further determine the process trigger by detecting the vertical change trigger 330 of FIG. 3, the vertical movement event 332 of FIG. 3, or a combination thereof using one or more of the control circuits, one or more of the low-power circuits, one or more of the high-power circuits, or a combination thereof. The computing system 100 can detect the vertical change trigger 330 based on the movement measurement 234 or a portion therein. The computing system 100 can detect the vertical movement event 332 based on the sensor data and the vertical change trigger 330.

The computing system 100 can use the vertical movement event 332 to trigger or implement one or more steps, such as the step 724, the step 726, the step 728, the step 730, the step 710, or a combination thereof. Details regarding the determination of the process trigger in the step 722, along with interaction of the trigger with other steps, are described below.

The computing system 100 can determine environmental data in the step 724. The computing system 100 can determine the environmental data based on the determination of the processing trigger in the step 722. The computing system 100 can determine the environmental data by determining the sensor data from the user device, determining the reference measurement 318 of FIG. 3 corresponding to the sensor data, or a combination thereof.

For example, the computing system 100 can determine the environment measurement 228 of FIG. 2 representing conditions measured within the building structure 202 located at the structure geographic location 204. The computing system 100 can determine the environment measurement 228 using the first device 102, the further device 108, or a combination thereof based on detecting the vertical movement event 332 corresponding to the first device 102, the further device 108, or a combination thereof. The computing system 100 can further determine the reference measurement 318 at the time of or concurrent with the environment measurement 228, the vertical movement event 332, or a combination thereof.

The computing system 100 can use or implement the data acquisition module 602, the relative altitude module 606, the environment reference module 642, or a combination thereof to determine the environment measurement 228. For example, the device measurement module 618 of FIG. 6, the data acquisition module 602, or a combination thereof can use one or more of the sensor circuits to determine the environment measurement 228.

As a more specific example, the computing system 100 can determine environmental data in the step 724 using the first location circuit 462, the third location circuit 562, or a combination thereof to determine the device altitude 232 of FIG. 2. Also as a more specific example, the computing system 100 can use the first accelerometer 464, the first gyroscope 466, the third accelerometer 564, the third gyroscope 566, or a combination thereof to determine the movement measurement 234. The computing system 100 can use the first control circuit 412, the third control circuit 512, or a combination thereof to determine the device altitude 232 from the movement measurement 234 using the dead-reckoning mechanism.

Also as a more specific example, the computing system 100 can use the first pressure sensor 468 of FIG. 4, the second pressure sensor 568, or a combination thereof to determine the pressure measurement 230 of FIG. 2. The computing system 100 can use the first control circuit 412, the second control circuit 434, the third control circuit 512, or a combination thereof to calculate the device altitude 232 based on the pressure measurement 230.

Also as a more specific example, the computing system 100 can use the first communication circuit 416, the second communication circuit 436, the third communication circuit 516, or a combination thereof to communicate the movement measurement 234, the pressure measurement 230 or a combination thereof between devices. The computing system 100 can determine the device altitude 232 based on processing the communicated data with the second control circuit 434, the first control circuit 412, the third control circuit 512, or a combination thereof similarly as described above.

Also for example, the reference measurement module 620 of FIG. 6, the environment reference module 642 of FIG. 6, or a combination thereof can use one or more of the control circuits, one or more of the communication circuits, one or more of the storage interfaces, or a combination thereof to determine the reference measurement 318, such as the sea-level altitude 648 of FIG. 6, the sea-level pressure 650 of FIG. 6, or a combination thereof. As a more specific example, the computing system 100 can use the first communication circuit 416, the second communication circuit 436, the third communication circuit 516, or a combination thereof to access the reference location, such as a weather center, a publically available service for weather data, the calibration location 310, or a combination thereof.

Continuing with the specific example, the computing system 100 can receive the reference measurement 318 from the reference location. The computing system 100 can receive the reference measurement 318 based on or as initiated by determination of the sensor data, by the process trigger, or a combination thereof. The computing system 100 can further receive or search for the reference measurement 318 corresponding to the time stamp 242 of FIG. 2 of the sensor data.

The computing system 100 can calculate the relative height in the step 726. The computing system 100 can use or implement the relative altitude module 606 to determine the relative altitude 306 corresponding to the first device 102, the further device 108, or a combination thereof.

The computing system 100 can determine the relative altitude 306 based on normalizing the environment measurement 228, such as the device altitude 232 or the pressure measurement 230, by calculating the relative altitude 306, communicating the relative altitude 306 between devices, or a combination thereof. The computing system 100 can determine the relative altitude 306 for normalizing the environment measurement 228 across multiple user devices, such as across the first device 102 and the further device 108 sourcing the environment measurement, across different times, as represented by different values of the time stamp 242, or a combination thereof.

The computing system 100 can determine the relative altitude 306 based on the device adjustment measure 320. The computing system 100 can use the device adjustment measure 320 to calibrate or adjust the environment measurement 228. The computing system 100 can use the device adjustment measure 320 to normalize the differences between devices or the sensor circuits therein. The computing system 100 can use the device adjustment measure 320 representing a difference in a previous corresponding sensor data relative to the calibration location 310 and the reference measurement 318 thereof.

The relative altitude 306 can be for locating the measuring device, such as the first device 102 or the further device 108, along the vertical direction using the internal map 206 of FIG. 2 of the building structure 202. The relative altitude 306 can also be for generating the internal map 206 of the building structure 202.

The computing system 100 can calculate the relative altitude 306 based on adjusted instance of the environment measurement 228, the reference measurement 318, or a combination thereof. For example, the computing system 100 can calculate the relative altitude 306 based on the pressure measurement 230, the device altitude 232, or a combination thereof after adjustment with the device adjustment measure 320. Also for example, the computing system 100 can calculate the relative altitude 306 based on the sea-level altitude 648, the sea-level pressure 650, the entry-exit altitude 240, one or more predetermined or known constants, or a combination thereof.

As a more specific example, the computing system 100 can calculate the device altitude 232 based on:

$$A_u \leftarrow A_s + \frac{R*T}{M*g}\log\left(\frac{P_s}{P_u}\right).$$ Equation (1).

The device altitude 232 can be represented as '$A_u$' and the reference measurement 318, such as the sea-level altitude 648 or altitude at a reference location, can be represented as '$A_s$'. The term 'R' can represent the universal gas constant, the term 'T' can represent the standard temperature, the term 'M' can represent the Molar mass of Earth's air, and 'g' can represent the gravitational acceleration, all known to or stored in the computing system 100. The pressure measurement 230 can be represented as '$P_u$' and the sea-level pressure 650 or the pressure measured at the reference location can be represented as '$P_s$'. The pressure measurement 230 can be measured by the user device.

Continuing with the more specific example, the computing system 100 can calculate the relative altitude 306 based on the device altitude 232 and the entry-exit altitude 240 of the building structure 202. The computing system 100 can calculate the relative altitude 306 based on:

$$A_r \leftarrow A_u - A_l$$ Equation (2).

The relative altitude 306 of the corresponding to the user device at location 'l' can be represented as '$A_r$', and the term '$A_l$' can represent altitude or elevation of the structure geographic location 204. The altitude or elevation of the structure geographic location can correspond to the entry-exit altitude 240.

The computing system 100 can determine the relative altitude 306 using the first device 102, the second device 106, the further device 108, or a combination thereof. For example, the computing system 100 can receive the reference measurement 318 and calculate the relative altitude 306 at or using the first device 102, the further device 108, or a combination thereof determining or sourcing the sensor data.

Continuing with the example, the computing system 100 can send the relative altitude 306 from the first device 102, the further device 108, or a combination thereof to the second device 106. The first device 102, the further device 108, or a combination thereof can send the relative altitude 306 based on entry-exit event 238, the vertical change trigger 330, the vertical movement event 332, or a combination thereof.

Also for example, the computing system 100 can further determine the relative altitude 306 based on calculating the relative altitude 306 at or using the second device 106. The first device 102, the further device 108, or a combination thereof can send the various data discussed above, such as the sensor data or the entry-exit altitude 240, to the second device 106.

Continuing with the example, the first device 102, the further device 108, or a combination thereof can send the data based on entry-exit event 238, the vertical change trigger 330, the vertical movement event 332, or a combination thereof. The second device 106 can receive the reference measurement 318 and calculate the relative altitude 306 at or using the second device 106.

It has been discovered that the relative altitude 306 provides accurate mapping for the tier 210 within the building structure 202. The relative altitude 306 can normalize the sensor data associated with the device altitude 232 across multiple devices or across various times. The relative altitude 306 allows the computing system 100 to implement the tier mapping mechanism 226 of FIG. 2 with increased amount of data from various devices and across different times.

It has further been discovered that the relative altitude 306 calculated using unsupervised mechanism as described above provides increased efficiency for vertically mapping the building structure 202 and vertically locating a device therein. The computing system 100 can implement the tier mapping mechanism 226, the vertical localization mechanism 302 of FIG. 3, or a combination thereof to process the relative altitude 306 without utilizing the direct user input 114 of FIG. 1 and without utilizing the structural base-information 116 of FIG. 1. The normalized data associated with altitude can be used to identify height groupings associated with the tier 210 and the user's altitude relative to the tier 210.

The computing system 100 can determine the tier transition in the step 728. The computing system 100 can determine the system user 110, the further user 112, or a combination thereof carrying the first device 102, the further device 108, or a combination thereof vertically transitioning between tiers within the building structure 202.

The computing system 100 can determine the tier-change access location 216 of FIG. 2 on the tier 210, the tier-change type 218 of FIG. 2 at the tier-change access location 216, or a combination thereof for the tier transition. The computing system 100 can implement or use the classification module 612 of FIG. 6, the relative altitude module 606, or a combination thereof to determine the tier-change access location 216, the tier-change type 218, or a combination thereof.

The computing system 100 can determine the tier-change access location 216 based on the environment measurement 228. The computing system 100 can further determine the tier-change access location 216 for providing a vertical connection to or from the tier 210 to another instance of the tier 210 of the building structure 202. The computing system 100 can determine the tier-change type 218 corresponding to the tier-change access location 216 based on the environment measurement 228. The tier-change type 218 can be for representing the vertical path 220 of FIG. 2, the escalator 222 of FIG. 2, the elevator 224 of FIG. 2, or a combination thereof within the building structure 202.

The computing system 100 can determine the tier-change access location 216, the tier-change type 218, or a combination thereof based on the sensor data, such as the environment measurement 228, the movement measurement 234, the device location 236, or a combination thereof. The computing system 100 can calculate the pressure slope 622 of FIG. 6, the movement correlation 624 of FIG. 6, the movement energy 626 of FIG. 6, or a combination thereof based on the sensor data.

For example, the computing system 100 can calculate the pressure slope 622 based on instances of the pressure measurement 230 across different times. The computing system 100 can calculate the pressure slope 622 based on instances of the pressure measurement 230 corresponding to different values of the time stamp 242.

As a more specific example, the computing system 100 can calculate the pressure slope 622 based on:

$$\text{slope} = \frac{p_{t_2} - p_{t_1}}{t_2 - t_1}. \quad \text{Equation (3).}$$

The pressure slope 622 can be represented as 'slope'. The term '$p_{t_2}$' can represent the pressure slope 622 at time or the time stamp 242 associated thereto represented as '$t_2$'. The term '$p_{t_1}$' can represent the pressure slope 622 at time or the time stamp 242 associated thereto represented as '$t_1$'.

Also for example, the computing system 100 can calculate the movement correlation 624 based on the device location 236 or the movement measurement 234 along the horizontal plane, the vertical direction, or a combination thereof. The computing system 100 can calculate the movement correlation 624 based on a ratio of covariance and the product of standard deviation.

As a more specific example, the computing system 100 can calculate the movement correlation 624 based on:

$$\text{corr}(x, y) = \frac{\text{cov}(x, y)}{\sigma_x * \sigma_y}. \quad \text{Equation (4).}$$

The movement correlation 624 can be represented as 'corr(x,y)'. The terms 'x' and 'y' can represent directions or axes that are orthogonal to each other, such as for the horizontal plane, the vertical direction of the user's movement direction, or a combination thereof. The term 'cov(x,y)' can represent a covariance of the device location 236 or the movement measurement 234 with respect to the 'x' and 'y' direction or axes. The term '$\sigma_x$' can represent the standard of deviation for the device location 236 or the movement measurement 234 with respect to the 'x' axis, and the term '$\sigma_y$' can represent the standard of deviation for the device location 236 or the movement measurement 234 with respect to the 'y' axis.

Also for example, the computing system 100 can calculate the movement energy 626 based on analyzing the device location 236 or the movement measurement 234 in a different domain, such as the frequency domain. The computing system 100 can calculate the movement energy 626 based on squared magnitude values of discrete FFT for the device location 236 or the movement measurement 234.

As a more specific example, the computing system 100 can calculate the movement energy 626 based on:

$$\text{Energy} = \frac{\sum_{k=1}^{|w|} |v_i^2|}{|w|}. \quad \text{Equation (5).}$$

'Energy' can represent the sum of squared discrete FFT component magnitudes of the accelerometer data. The term 'v' can represent a vector of FFT components of the accelerometer data and 'w' can represent the total number of FFT components.

The computing system 100 can identify or determine the vertical movement event 332 representing the vertical transition from one instance of the tier 210 to another instance of the tier 210. The computing system 100 can identify or determine the vertical movement event 332 based on the sensor data, the pressure slope 622, the movement correlation 624, the movement energy 626, or a combination thereof. Details regarding the determination of the vertical movement event 332 are discussed below.

The computing system 100 can determine the tier-change access location 216 as the device location 236 along the horizontal plane on corresponding instances of the tier 210 at the time of the vertical movement event 332. For example, the computing system 100 can determine the tier-change access location 216 as the device location 236 on the tier 210 at the beginning of the vertical movement event 332. Also for example, the computing system 100 can determine the tier-change access location 216 as the device location 236 on the tier 210 at the end of the vertical movement event 332.

The computing system 100 can further determine the tier-change type 218 at the tier-change access location 216. The computing system 100 can determine the tier-change type 218 based on comparing the sensor data, the pressure slope 622, the movement correlation 624, the movement energy 626, or a combination thereof to the vertical movement set 322 of FIG. 3. For example, the computing system 100 can determine the tier-change type 218 as the vertical path 220 of FIG. 2 when the sensor data, the pressure slope 622, the movement correlation 624, the movement energy 626, or a combination thereof matches or satisfies path-movement set 324 of FIG. 3.

Also for example, the computing system 100 can determine the tier-change type 218 as the escalator 222 of FIG.

2 when the sensor data, the pressure slope 622, the movement correlation 624, the movement energy 626, or a combination thereof matches or satisfies escalator-movement set 328 of FIG. 3. Also for example, the computing system 100 can determine the tier-change type 218 as the elevator 224 of FIG. 2 when the sensor data, the pressure slope 622, the movement correlation 624, the movement energy 626, or a combination thereof matches or satisfies elevator-movement set 326 of FIG. 3.

The computing system 100 can further communicate the data in the step 730. The computing system 100 can communicate the data between circuits within a device. For example, the computing system 100 can store the sensor data, the relative altitude 306, the vertical movement event 332, the tier-change access location 216, the tier-change type 218, or a combination thereof in the first storage circuit 414, the second storage circuit 446, the third storage circuit 514, or a combination thereof.

The computing system 100 can further communicate the data between circuits between devices. For example, the computing system 100 can send and receive the sensor data, the relative altitude 306, the vertical movement event 332, the tier-change access location 216, the tier-change type 218, or a combination thereof between the first device 102, the second device 106, the further device 108, or a combination thereof. The computing system 100 can send and receive the data using the first communication circuit 416, the second communication circuit 436, the further communication circuit 516, or a combination thereof.

As a more specific example, the computing system 100 can determine the relative altitude 306 from the perspective of the second device 106 receiving the relative altitude 306 that is calculated by the user device. The second device 106 can similarly receive the vertical movement event 332, the tier-change access location 216, the tier-change type 218, or a combination thereof calculated by the user device.

Also as a more specific example, the computing system 100 can communicate the sensor data to the second device 106 for calculating the relative altitude 306, the vertical movement event 332, the tier-change access location 216, the tier-change type 218, or a combination thereof at or using the second device 106. Also as a more specific example, the computing system 100 can send the sensor data, the relative altitude 306, or a combination thereof based on the vertical movement event 332 for generating the internal map 206 with the second device 106 using the sensor data, the relative altitude 306, or a combination thereof received by the second device 106.

The computing system 100 can generate the internal map 206 in the step 708 including altitude or floor level map. The computing system 100 can generate the internal map 206 for mapping one or more instances of the tier 210 of the building structure 202 along the vertical direction.

The computing system 100 can generate the internal map 206 for vertically locating the end user, such as the first device 102 or the further device 108, a device associated thereto, or a combination thereof on one instance of the tier 210 within the building structure 202. The computing system 100 can generate the internal map 206 based on the sensor data, the relative altitude 306 representing or corresponding to the sensor data, or a combination thereof.

The computing system 100 can use or implement the map module 614 of FIG. 6, the classification module 612, or a combination thereof to generate the internal map 206. The computing system 100 can further implement or use such as the tier mapping mechanism 226 to generate the internal map 206.

The computing system 100 can further vertically map tiers in a step 732 for generating the map in the step 708. The computing system 100 can vertically map one or more instances of the tier 210 based on identifying the relative vertical cluster 652 of FIG. 6. The computing system 100 can identify the relative vertical cluster 652 based on the sensor data, the relative altitude 306 representing or associated with the sensor data, or a combination thereof for representing locations along the vertical direction.

The computing system 100 can identify an existence of one or more tiers, the relative locations thereof, or a combination thereof within the building structure 202 based on the relative vertical cluster 652. The computing system 100 can recognize a grouping of the relative altitude 306, identified as the relative vertical cluster 652, as an instance of the tier 210.

The computing system 100 can identify a grouping or a set of the relative altitude 306 within a threshold range of values. The computing system 100 can utilize or analyze the instances of the relative altitude 306 associated with different devices, associated with different values of the time stamp 242, or a combination thereof.

The computing system 100 can further generate the vertical profile 208 of FIG. 2. The computing system 100 can generate the vertical profile 208 based on counting a number of vertical groupings corresponding to the building structure 202.

The computing system 100 can determine the relative altitude 306 of the relative vertical cluster 652, such as a median altitude value or an average altitude value, as the relative tier altitude 212 of FIG. 2. The computing system 100 can further generate the tier separation profile 214 of FIG. 2 based on calculating differences of the relative tier altitude 212 for all identified or recognized instances of the tier 210 for the building structure 202.

The computing system 100 can use the user device, the second device 106, or a combination thereof to generate the internal map 206. As a more specific example, the computing system 100 can generate the internal map 206 at or using the second device 106. The second device 106 can determine the sensor data based on receiving the relative altitude 306 representing the sensor data, such as the pressure measurement 230, the movement measurement 234, or a combination thereof measured following the vertical movement event 332.

The computing system 100 can further determine transition points in a step 734 for generating the map in the step 708. The computing system 100 can determine transition points by generating the internal map 206 including the tier-change access location 216 and locating the tier-change access location 216 on the tier 210 within the building structure 202. The computing system 100 can further determine transition points by generating the internal map 206 including the tier-change type 218 at the tier-change access location 216 located on the tier 210 within the building structure 202.

The computing system 100 can generate the internal map 206 including the tier-change access location 216 based on identifying a location on a horizontal plane matching on the corresponding instance of the tier 210. The computing system 100 can generate the internal map 206 including the tier-change access location 216 according to the tier-change access location 216 from the end user device. The computing system 100 can further identify or determine the tier-change access location 216 at or using the second device 106 based on the sensor data, the vertical movement event 332, or a combination thereof from the end user device.

The computing system 100 can generate the internal map 206 including the tier-change type 218 based on identifying a type or a category of transition available at the tier-change access location 216. The computing system 100 can generate the internal map 206 including the tier-change type 218 according to the tier-change type 218 from the end user device. The computing system 100 can further identify or determine the tier-change type 218 at or using the second device 106 based on the sensor data, the vertical movement event 332, or a combination thereof from the end user device.

The computing system 100 can generate the internal map 206 based on generating a file or a record visually illustrating the instances of the tier 210, textually describing instances of the tier 210, or a combination thereof. The computing system 100 can generate the internal map 206 including the vertical profile 208 by visually illustrating or textually describing the number of tiers, the relative tier altitude 212 of each tier, the tier separation between tiers, or a combination thereof.

As described above, the computing system 100 can generate the internal map 206 using an unsupervised mechanism, such as the tier mapping mechanism 226, without utilizing the direct user input 114 and without utilizing the structural base-information 116. The computing system 100 can generate the internal map 206 based on the relative altitude 306, the sensor data, or a combination thereof.

The computing system 100 can use one or more of the control circuits to generate the internal map 206. The computing system 100 can further use one or more of the communication circuits to communicate the necessary data between devices. The computing system 100 can store the internal map 206 in one or more of the storage circuits.

It has been discovered that the internal map 206 generated using the relative altitude 306 provides reliable vertical mapping and localization for buildings without degrading usability. The internal map 206 can utilize the relative altitude 306 for enabling normalization and use of crowd-sourced data from various devices and at various times. The internal map 206 based on the relative altitude 306 can be processed and generated without relying on the direct user input 114 and the structural base-information 116 for preserving usability.

It has further been discovered that the internal map 206 including the tier-change access location 216 and the tier-change type 218 provides increased usability. The internal map 206 including the tier-change access location 216 and the tier-change type 218 can inform the end user of various information regarding vertical traversals within the building structure 202.

The computing system 100 can vertically locate the user in the step 710. The computing system 100 can vertically locate the system user 110, the further user 112, or a combination thereof or the device associated thereto, such as the first device 102, the further device 108, or a combination thereof, within the building structure 202.

The computing system 100 can use the floor localization module 610 of FIG. 6, the map module 614, the relative altitude module 606, or a combination thereof to vertically locate the end user. The communication system 100 can use one or more of the control circuits to determine the user current floor 308 of FIG. 2 within the building structure 202. The communication system 100 can use one or more of the communication circuits to communicate necessary data, intermediate result, the user current floor 308, or a combination thereof between devices. The communication system 100 can store the user current floor 308 in one or more of the storage circuits.

The computing system 100 can determine the user current floor 308 based on the relative altitude 306 of the corresponding device, the internal map 206 including the vertical profile 208, the sensor data, or a combination thereof. The computing system 100 can determine the user current floor 308 based on a trigger, such as the entry-exit event 238, trigger from the step 722, calculation of the relative height in the step 726, or a combination thereof. Details regarding the vertical location of the user are discussed below.

Referring now to FIG. 8, therein is shown a detailed exemplary flow chart for calibrating device step 712 of FIG. 7. The computing system 100 can calibrate the device by identifying calibration location in a step 802, determining a calibration event in a step 804, determining a device measurement in a step 806, determining a reference value in a step 808, calculating an adjustment in a step 810, or a combination thereof. Since the pressure measurements vary across device models, calibration can be used to normalize the pressure measurements so that they are easily comparable.

The computing system 100 can identify the calibration location in the step 802. The computing system 100 can identify the calibration location 310 of FIG. 3. The computing system 100 can identify the calibration location 310 relevant to the user device subject to the calibration process, such as the first device 102 of FIG. 1, the further device 108 of FIG. 1, or a combination thereof.

The computing system 100 can identify the calibration location 310 relevant to the user device based on the device location 236 of FIG. 2 of the user device. The computing system 100 can identify the calibration location 310 based on the device location 236 of the first device 102, the further device 108, or a combination thereof outside of or external to the building structure 202 of FIG. 2. For example, the computing system 100 can identify one or more instances of the calibration location 310 based on satisfying an initial portion of the calibration condition 314 of FIG. 3, a buffered threshold or range based on the calibration condition 314, or a combination thereof.

As a more specific example, the computing system 100 can identify one or more instances of the calibration location 310 based on a distance between the device location 236 and the calibration location 310, such as the calibration location 310 within a distance associated with the calibration condition 314 or ranked based on nearest distance to the device location 236. Also as a more specific example, the computing system 100 can identify one or more instances of the calibration location 310 based on the device location 236 including the device altitude 232 of FIG. 2 same or within a threshold range from the altitude of the calibration location 310.

The computing system 100 can use the dynamic calibration module 608 of FIG. 6, the data acquisition module 602 of FIG. 6, or a combination thereof to identify the calibration location 310. The computing system 100 can further use one or more of the location circuits, one or more of the accelerometers, one or more of the communication circuits, one or more of the control circuits, or a combination thereof to determine the device location 236.

The computing system 100 can use one or more storage interfaces, one or more control interfaces, one or more communication circuits, or a combination thereof to access a map or a listing of the calibration locations predetermined and known to the computing system 100. The computing system 100 can use one or more of the control circuits to identify the relevant instances of the calibration location 310.

The computing system 100 can determine the calibration event in the step 804. The computing system 100 can determine the calibration event 312 of FIG. 3. The computing system 100 can determine the calibration event 312 based on the user device satisfying the calibration condition 314.

For example, the computing system 100 can determine the calibration event 312 based on comparing the calibration location 310 and the device location 236. As a more specific example, the computing system 100 can determine the calibration event 312 when the device location 236 is within a threshold distance from the calibration location 310, when the device location 236 overlaps or is within the calibration location 310, when the device altitude 232 of the device location 236 matches or is within a threshold range of the altitude of the calibration location 310, or a combination thereof according to the calibration condition 314.

The computing system 100 can use the dynamic calibration module 608 to determine the calibration event 312. The computing system 100 can use one or more storage interfaces, one or more control interfaces, one or more communication circuits, or a combination thereof to access the calibration condition 314 predetermined and known to the computing system 100. The computing system 100 can use one or more of the control circuits to compare and determine the calibration event 312.

The computing system 100 can determine the device measurement in the step 806. The computing system 100 can determine the sensor data for the user device associated with or triggering the calibration event 312. The computing system 100 can determine the environment measurement 228 of FIG. 2 based on or immediately subsequent to determination of the calibration event 312.

The computing system 100 can determine the sensor data including the environment measurement 228 of FIG. 2. The computing system 100 can determine the environment measurement 228 from, using, or generated by the first device 102, the further device 108, or a combination thereof associated with the calibration event 312. The computing system 100 can determine the environment measurement 228 for calculating the device adjustment measure 320 of FIG. 3 associated with the environment measurement 228 from or specific to the first device 102, the further device 108, or a combination thereof.

The computing system 100 can use the device factor module 632 of FIG. 6, the data acquisition module 602, or a combination thereof to determine the sensor data. The computing system 100 can use one or more of the sensor circuits, one or more of the control circuits, one or more of the communication circuits, or a combination thereof to determine the sensor data.

The computing system 100 can determine the reference value in the step 808. The computing system 100 can determine the reference value including the reference measurement 318 of FIG. 3 associated with the qualifying instance of the calibration location 310. The computing system 100 can determine the reference measurement 318 based on or immediately subsequent to determination of the calibration event 312. The computing system 100 can further determine the reference measurement 318 at the time represented by the time stamp 242 of FIG. 2 of the environment measurement 228.

The computing system 100 can determine the reference measurement 318 in a variety of ways. For example, the computing system 100 can determine the reference measurement 318 by communicating with the reference location and receiving the reference measurement 318 from the reference location. Also for example, the computing system 100 can communicate with a service providing real-time data or a previously recorded value for the reference measurement 318 at the reference location.

The computing system 100 can use the external factor module 630 of FIG. 6, the environment reference module 642 of FIG. 6, or a combination thereof to determine the reference measurement 318. The computing system 100 can use one or more of the communication circuits, one or more of the control circuits, one or more of the storage interface, or a combination thereof to determine the reference measurement 318.

The computing system 100 can calculate the adjustment in the step 810. The computing system 100 can calculate the adjustment by calculating the device adjustment measure 320. The computing system 100 can calculate the device adjustment measure 320 specific to the device causing the calibration event 312 and providing the sensor data.

The computing system 100 can calculate the device adjustment measure 320 based on the sensor data and the reference measurement 318. For example, the computing system 100 can calculate the device adjustment measure 320 as a difference between the reference measurement 318 and the environment measurement 228, such as the pressure measurement 230 of FIG. 2, the device altitude 232 of FIG. 2, or a combination thereof.

Also for example, the computing system 100 can calculate the device adjustment measure 320 as a median or a mean value for the differences between the reference measurement 318 and the environment measurement 228 corresponding to multiple separate instances of the calibration event 312. The computing system 100 can calculate the mean or the average of the values corresponding to different times, different locations or altitude, or a combination thereof. The computing system 100 can further determine a pattern or a factor for influencing or adjusting the device adjustment measure 320 based on weather, altitude, geographic location, time of day, or a combination thereof.

The computing system 100 can calculate the device adjustment measure 320 for calibrating future or latter instances of the sensor data, such as the environment measurement 228. The computing system 100 can calibrate using known or validated values in the reference measurement 318 relative to the calibration location 310. The computing system 100 can use the device adjustment measure 320 to adjust, correct, or update the sensor data, determine the relative altitude 306 of FIG. 3, or a combination thereof.

The computing system 100 can use the dynamic calibration module 608 to calculate the device adjustment measure 320. The computing system 100 can further use one or more of the control circuit, one or more of the communication circuit, or a combination thereof to calculate the device adjustment measure 320. The computing system 100 can store the device adjustment measure 320, as well as other intermediate values, such as the calibration event 312, the calibration location 310, the reference measurement 318, the sensor data, or a combination thereof in one or more of the storage circuits.

The computing system 100 can implement the above described steps of FIG. 8 using one or more of the devices therein, such as the first device 102, the second device 106 of FIG. 1, the further device 108, or a combination thereof. For example, the computing system 100 can have the end user devices upload the sensor data to the second device 106 on a periodic basis using one or more of the communication circuits.

Continuing with the example, the second device 106 can identify the calibration location 310, determine the calibration event 312, determine the sensor data from the uploaded data, determine the reference measurement 318, and calculate the device adjustment measure 320. The second device 106 can communicate the device adjustment measure 320 to the end user device for adjusting the sensor data at the end user device, or store the device adjustment measure 320 within the second device 106 for adjusting at the second device 106 after receiving the uploaded data.

Also for example, the computing system 100 can have the steps in FIG. 8 implemented in the end user device, such as the first device 102, the further device 108, or a combination thereof. As a more specific example, the end user device can access the map or the listing stored therein for identifying the calibration location, determine the calibration event, determine the device measurement, determine the reference value, and calculate the adjustment. The end user device can store the device adjustment measure 320 and utilize the device adjustment measure 320 to adjust future or subsequent sensor data.

Also for example, the computing system 100 can utilize the end user device along with the second device 106 to calibrate the end user device. As a more specific example, the second device 106 can perform step 802 and 804 based on the device location 236 sent by the end user device. The second device 106 can trigger the end user device to perform steps 806, 808, 810, or a combination thereof. Also as a more specific example, the second device can perform the step 808 and provide the results to the end user device.

As a more specific example, the calibration event 312 can be detected when the system user 110 is located outside any structure based on the step 802 and the step 804. The calibration event 312 can be detected based on the sensor circuit of the first device 102, such as the phone's GPS sensor.

Continuing with the more specific example, the computing system 100 can acquire the geographical altitude of the location, represented above in equation (2) as '$A_l$' based on the step 802, the step 808, or a combination thereof. The computing system 100 can acquire the geographical altitude using a publically available web service.

Continuing with the more specific example, the computing system 100 can acquire the geographic pressure value at the seal level, such as the sea-level pressure 650, or at the calibration location 310 as the reference measurement 318 based on the step 808. The computing system 100 can further acquire or access the sea-level altitude 648 corresponding to the sea-level pressure 650.

Continuing with the more specific example, the computing system 100 can measure the atmospheric pressure based on the step 806. The computing system 100 can measure the calibration measurement 316 including the pressure measurement 230 from the pressure sensor.

Continuing with the more specific example, the computing system 100 can calculate the adjustment in the step 810 using the reference measurement 318 and the calibration measurement 316. The computing system 100 can calculate the device altitude 232 based on the sea-level pressure 650 and the calibration measurement 316. The computing system 100 can calculate the device altitude 232 using Equation (1) above.

Continuing with the more specific example, the computing system 100 can calculate and store the difference between the device altitude 232 and the known altitude of the calibration location 310 '$A_l$'. The difference can be stored as the device adjustment measure 320. The computing system 100 can further repeat the calibration process and update the device adjustment measure 320 based on averaging the difference values for each calibration session.

Continuing with the more specific example, the computing system 100 can use the adjustment measure 320 to adjust the sensor data, the altitude value, or a combination thereof for subsequent processing. The computing system 100 can subtract the sensor data, the altitude value, or a combination thereof with the adjustment measure 320. With this correction, the measured altitude values across mobile devices can be normalized with respect to the same baseline. It has been discover that this is especially useful for clustering the relative heights on the cloud for generating the altitude map of a building.

It has been discovered that the device adjustment measure 320 provides increased accuracy for vertically mapping the building structure 202 and vertically locating the end user devices within the building structure 202. The device adjustment measure 320 can be calculated based on known and trusted measurements contemporaneous with the sensor data. The device adjustment measure 320 can correct for the inconsistency, inaccuracy, an offset, a sensitivity level, or a combination thereof present in individual sensing circuitry.

Referring now to FIG. 9, therein is shown a detailed exemplary flow chart for calculating entry-exit altitude step 704 of FIG. 7. The computing system 100 of FIG. 1 can calculate the entry-exit altitude in step 704 based on determination of the entry event in the step 714 as discussed above. The calculation of the entry-exit altitude in the step 704 can include determining environment data in a step 902, determining relative height in a step 904, communicating or storing the data in a step 906, or a combination thereof.

The computing system 100 can determine the environment data in the step 902. The computing system 100 can determine the environment data by determining the environment measurement 228 of FIG. 2. The computing system 100 can determine the environment measurement 228 based on the entry-exit event 238 of FIG. 2. The computing system 100 can determine the environment measurement 228 at the time of determination of the entry-exit event 238 or immediately preceding the entry event.

The computing system 100 can determine the environment measurement 228 at or using the end user device, such as the first device 102 of FIG. 1 or the further device 108 of FIG. 1, associated with the entry-exit event 238. The computing system 100 can determine the environment measurement 228 for calculating the entry-exit altitude 240 of FIG. 2 representing the altitude of the structure geographic location 204 of FIG. 2 for the building structure 202 of FIG. 2 or the altitude of an entry/exit way thereto.

The computing system 100 can determine the environment measurement 228 similarly as discussed above for the step 724 of FIG. 7, the step 806 of FIG. 8, or a combination thereof. The computing system 100 can determine the environment measurement 228 using the data acquisition module 602 of FIG. 6, the entrance-exit module 604 of FIG. 6, the reference level module 616 of FIG. 6, or a combination thereof. The computing system 100 can further determine the environment measurement 228 using one or more of the control circuits, one or more of the sensor circuits, or a combination thereof.

The computing system 100 can determine the relative height in the step 904. The computing system 100 can determine the relative height based on determining the relative altitude 306 of FIG. 3.

The computing system 100 can determine the relative altitude 306 for representing the sensor data including the environment measurement 228 of FIG. 2 corresponding to the device altitude 232 of FIG. 2 relative to the entry-exit altitude 240. The computing system 100 can determine the relative altitude 306 based on the sensor data contemporaneous with or immediately preceding the entry-exit event 238 as the entry-exit altitude 240.

The computing system 100 can determine the relative altitude 306 similarly as discussed above for the step 726 of FIG. 7. The computing system 100 can determine the relative altitude 306 using the relative altitude module 606 of FIG. 6 corresponding to the first device 102, the further device 108, or a combination thereof associated with the entry-exit event 238. The computing system 100 can further determine the relative altitude 306 using one or more of the control circuits.

The computing system 100 can communicate or store the data in the step 906. The computing system 100 can communicate or store the calibration event 312 of FIG. 3, the sensor data corresponding to the calibration event 312, the relative altitude 306 corresponding to the calibration event 312, or a combination thereof. The computing system 100 can store the calibration event 312, the sensor data, the relative altitude 306, or a combination thereof in one or more of the storage circuits.

The computing system 100 can implement the above described steps of FIG. 9 using one or more of the devices therein, such as the first device 102, the second device 106 of FIG. 1, the further device 108, or a combination thereof. The computing system 100 can implement similarly as described above.

For example, the computing system 100 can have the end user devices upload the sensor data to the second device 106 on a periodic basis using one or more of the communication circuits, and the second device 106 can determine the relative altitude 306 and the entry-exit altitude 240. The second device 106 can communicate the relative altitude 306 to the end user device, or store the relative altitude 306 within the second device 106.

Also for example, the computing system 100 can have the steps in FIG. 9 implemented in the end user device, such as the first device 102, the further device 108, or a combination thereof. Also for example, the computing system 100 can utilize the end user device along with the second device 106 to calibrate the end user device. As a more specific example, the second device 106 can perform the step 714, the step 904, the step 906, or a combination thereof and provide the results to the end user device.

It has been discovered that the entry-exit altitude 240 determined based on the entry-exit event 238 provides increased accuracy in mapping and localization processes. The entry-exit altitude 240 determined based on the entry-exit event 238 can enable the use of unsupervised mechanisms to map the building structure 202 and vertically locate devices. The entry-exit altitude 240 can further account for the altitude of the building structure 202 to increase the accuracy.

It has further been discovered that the entry-exit altitude 240 based on the relative altitude 306 provides increased accuracy in mapping and localization processes. The relative altitude 306 can provide normalized values for representing the altitude of the building structure 202. Use of the relative altitude 306 can further enable the computing system 100 to process the entry-exit altitude 240 across multiple devices, across multiple times, specific to certain type or group of devices, or a combination thereof.

Figures 10, 11:
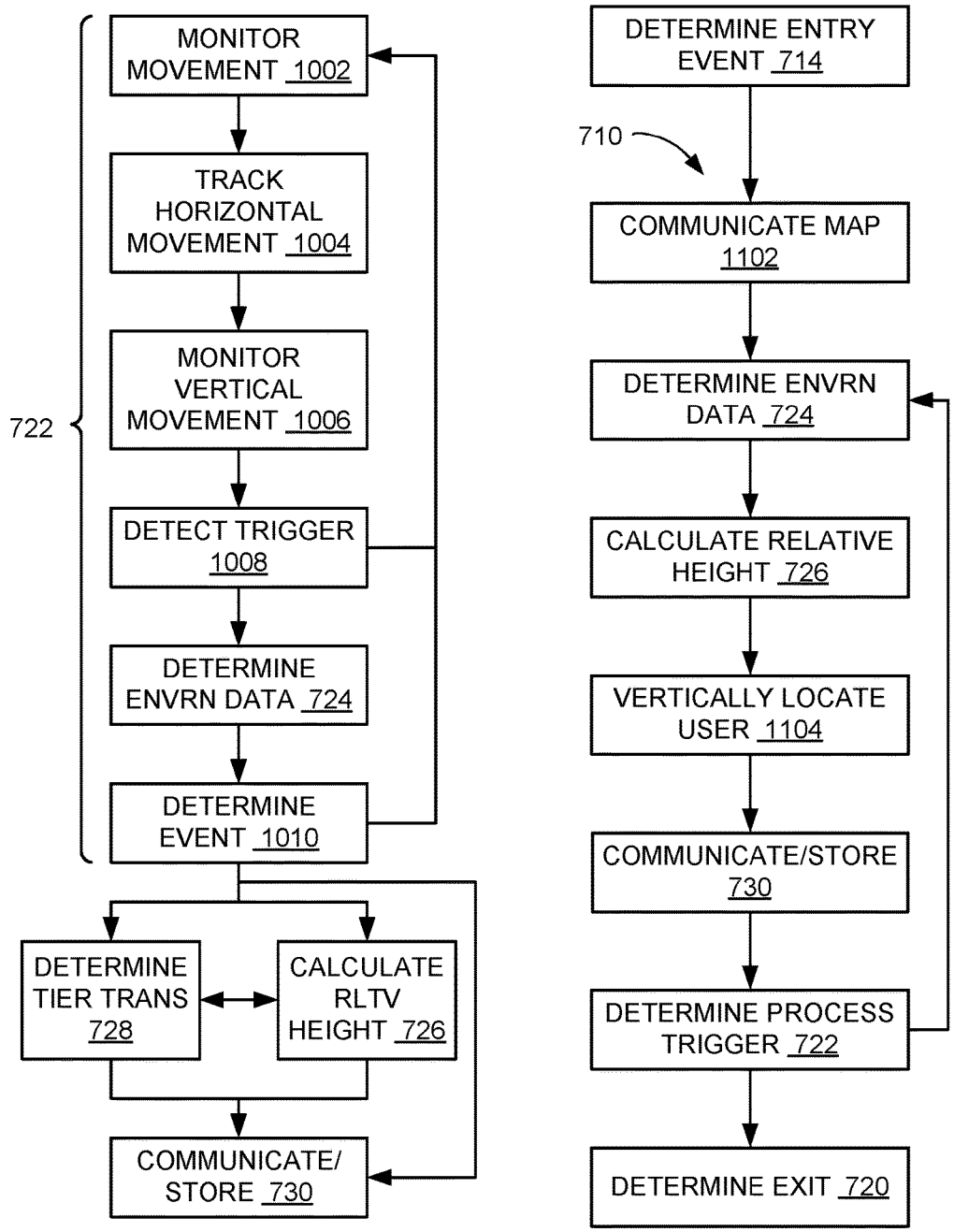
FIG. 10 is a detailed exemplary flow chart for determining process trigger step of FIG. 7 and other subsequent steps of FIG. 7.
FIG. 11 is a detailed exemplary flow chart for vertically locating step of FIG. 7.

Referring now to FIG. 10, therein is shown a detailed exemplary flow chart for determining process trigger step 722 of FIG. 7. The computing system 100 can determine the process trigger step 722 for implementing the calculation of the relative height step 726, determination of the tier transition step 728, vertical location of the user step 710 of FIG. 7, or a combination thereof. The determination of the process trigger 722 can include monitoring of movement in step 1002, tracking of horizontal movement in step 1004, checking vertical movement in step 1006, detection of trigger in step 1008, determination of event in step 1010, or a combination thereof.

The computing system 100 can monitor the movement in the step 1002. The computing system 100 can monitor the physical movement of the first device 102 of FIG. 1, the further device 108 of FIG. 1, or a combination thereof. The computing system 100 can monitor the movement based on determining the device location 236 of FIG. 2 on the tier 210 of FIG. 2, the movement measurement 234 of FIG. 2 for the user device, or a combination thereof.

The computing system 100 can further monitor by storing the device location 236, the movement measurement 234, or a combination thereof, check or compare the data, or a combination thereof. For example, the computing system 100 can determine or initiate determination process periodically on a regular basis, sample at a regular interval, or a combination thereof for the device location 236, the movement measurement 234, or a combination thereof. Also for example, the computing system 100 can use or implement a running window or a memory buffer with first-in-first-out mechanism to store, analyze, or a combination thereof for the device location 236, the movement measurement 234, or a combination thereof.

The computing system 100 can use one or more of the sensor circuits, one or more of the control circuits, one or more of the communication circuits, or a combination thereof to determine or analyze the device location 236, the movement measurement 234, or a combination thereof. The computing system 100 can further store the data in one or more of the storage circuits. The computing system 100 can implement or use the running window or the memory buffer using one or more of the storage circuits or a portion therein.

The computing system 100 can track the horizontal movement in the step 1004. The computing system 100 can track the horizontal movement of the first device 102, the further device 108, or a combination thereof. The computing system 100 can track the horizontal movement by determining the device location 236 in the horizontal plane of the tier 210, storing the device location 236, or a combination thereof.

For example, the computing system 100 can use one or more of the control circuit, one or more of the communication circuit, one or more of the sensor circuit, or a combination thereof to determine the device location 236 within the building structure 202 of FIG. 2.

As a more specific example, the computing system 100 can use the first location circuit 462 of FIG. 4, the third location circuit 562 of FIG. 5, the first communication circuit 416 of FIG. 4, the second communication circuit 516 of FIG. 5, or a combination thereof to receive wireless signals, such as GPS signals, Wi-Fi signals, 4G LTE signals, or a combination thereof. The computing system 100 can use the first accelerometer 464 of FIG. 4, the first gyroscope 466 of FIG. 4, the third accelerometer 564 of FIG. 5, the third gyroscope 566 of FIG. 5, the first location circuit 462, the third location circuit 562, or a combination thereof to determine the movement measurement 234.

Continuing with the example, the computing system 100 can use the first location circuit 462, the third location circuit 562, the first communication circuit 416, the second communication circuit 516, the first control circuit 412 of FIG. 4, the second control circuit 434 of FIG. 4, the third control circuit 512 of FIG. 5, or a combination thereof to determine the device location 236. The computing system 100 can determine the device location 236 as by implementing GPS processing, Wi-Fi or Cell-Tower Triangulation mechanism, dead-reckoning mechanism, or a combination thereof to process the received signals, the movement measurement 234, or a combination thereof. The computing system 100 can use the first communication circuit 416, the second communication circuit 436, the third communication unit 516, or a combination thereof to communicate the device location 236, the received signal or a description thereof, the movement measurement 234, a processing result, or a combination thereof between devices.

The computing system 100 can store the horizontal location information as described above. For example, the computing system 100 can store the horizontal component of the device location 236 in one or more of the storage circuits. As a more specific example, the computing system 100 can store the horizontal location information in the memory buffer or the running window.

The computing system 100 can check the vertical movement in the step 1006. The computing system 100 can check the vertical movement by processing the movement measurement 234.

The computing system 100 can use one or more of the sensor circuits to determine the movement measurement 234 of the first device 102, the further device 108, or a combination thereof. The computing system 100 can further store the movement measurement 234 in one or more of the storage circuits, such as with the running window or the memory buffer.

The computing system 100 can use one or more of the control circuits to compare the movement measurement 234 to the vertical change trigger 330 of FIG. 3. The computing system 100 can further use one or more of the control circuits to calculate the pressure slope 622 of FIG. 6, the movement correlation 624 of FIG. 6, the movement energy 626 of FIG. 6, or a combination thereof. The computing system 100 can use one or more of the control circuits to compare the pressure slope 622, the movement correlation 624, the movement energy 626, or a combination thereof to the vertical change trigger 330.

The computing system 100 can detect the trigger in the step 1008. The computing system 100 can detect the trigger by detecting a trigger event based on the movement measurement 234 or a processing result thereof matching the vertical change trigger 330. The computing system 100 can use one or more of the control circuits to detect a match for the vertical change trigger 330 based on monitoring the movement measurement 234 of the first device 102, the further device 108, or a combination thereof. The computing system 100 can compare the data in the running window or the buffer with the vertical change trigger 330

The computing system 100 can perform or implement the steps 1002, 1004, 1006, 1008, or a combination thereof using one or more of the low-power circuits. For example, the computing system 100 can use the first low-power circuit 454 of FIG. 4, the third low-power circuit 554 of FIG. 5, or a combination thereof to monitor, track, check, detect, or a combination thereof.

As a more specific example, the computing system 100 can use a smaller circuit, a slower circuit, a less-sensitive circuit or process, a lower-complexity process, or a combination thereof to monitor, track, check, detect, or a combination thereof. Also as a more specific example, the computing system 100 can use a smaller or a slower core. Also as a more specific example, the computing system 100 can implement a simplified process on the core already in use. Also as a more specific example, the computing system 100 can use only a portion of the sensor circuit, such as the accelerometer, the gyroscope, the location circuit, or a combination thereof for the user device.

The computing system 100 can determine the environment data in the step 724 as discussed above. The computing system 100 can determine the environment data by determining the sensor data, such as the movement measurement 234, the environment measurement 228 of FIG. 2, a full or a more accurate instance of the device location 236, or a combination thereof, corresponding to the first device 102, the further device 108, or a combination thereof matching the vertical change trigger 330.

The computing system 100 can determine the sensor data based on or subsequent to recognition of a match for the vertical change trigger 330 using the low-power circuit. The computing system 100 can further use one or more of the high-power circuits to determine the sensor data.

For example, the computing system 100 can use the first high-power circuit 452 of FIG. 4, the second high-power circuit 552 of FIG. 5, or a combination thereof. As a more specific example, the computing system 100 can use a bigger or an additional core to measure or process the sensor data. Also as a more specific example, the computing system 100 can use a more complex or sensitive process to determine the sensor data. The computing system 100 can further calculate the pressure slope 622, the movement correlation 624, the movement energy 626, or a combination thereof based on or subsequent to the trigger.

Also as a more specific example, the computing system 100 can use portion of the sensor circuit previously kept dormant, such as the first pressure sensor 468 of FIG. 4 or the third pressure sensor 568 of FIG. 5. Also as a more specific example, the computing system 100 can use or implement more sensitive or complex portions of the sensor circuit to determine the sensor data.

The computing system 100 can determine the event in the step 1010. The computing system 100 can determine the event by determining the vertical movement event 332 of FIG. 3. The computing system 100 can determine the vertical movement event 332 based on the sensor data determined in response or subsequent to the match of the vertical change trigger 330.

The computing system 100 can determine the vertical movement event 332 based on comparing the sensor data with the vertical movement set 322 of FIG. 3. For example, the computing system 100 can determine the vertical movement event 332 based on the movement measurement 234, the device location 236, the environment measurement 228, the pressure slope 622, the movement correlation 624, the movement energy 626, a portion or a component thereof, a sequence thereof, or a combination thereof matching the path-movement set 324 of FIG. 3, the elevator-movement set 326 of FIG. 3, the escalator-movement set 328 of FIG. 3, or a combination thereof.

The computing system 100 can compare the data in the running window or the buffer with the vertical movement set 322. The flow can pass to the step 1002 when the vertical movement event 332 is not detected for a period of time or a number of samples following match of the vertical change trigger 330, similar to when the vertical change trigger 330 is not detected.

The computing system 100 can perform or initiate various steps based on determination of the event in the step 1010. For example, the computing system 100 can perform or initiate calculation of the relative height in the step 726, determination of the vertical transition in the step 728, communication or storage of the data in the step 730, or a combination thereof.

The computing system 100 can calculate the relative height in the step 726 as discussed above. The computing system 100 can calculate the relative height in the step 726 based on or subsequent to determination of the vertical change trigger 330, the vertical movement event 332, or a combination thereof.

The computing system 100 can determine the vertical transition in the step 728 as discussed above. The computing system 100 can determine the vertical transition based on or subsequent to determination of the vertical movement event 332.

The computing system 100 can determine the vertical transition by determining the tier-change access location 216 of FIG. 2, the tier-change type 218 of FIG. 2, or a combination thereof on one or more of the corresponding tier 210 of the building structure. The computing system 100 can determine the tier-change access location 216 as the horizontal location at the beginning, the end, or a combination thereof for the vertical movement event 332 as tracked in the step 1004.

The computing system 100 can determine the tier-change type 218 based on the movement information matching the vertical movement set 322. For example, the computing system 100 can determine the tier-change type 218 as the vertical path 220 of FIG. 2 when the movement information matches the path-movement set 324, as the elevator 224 when the movement information matches the elevator-movement set 326, the escalator-movement set 328, or a combination thereof.

The computing system 100 can further communicate or store the data in the step 730 as discussed above. The computing system 100 can store the various processing results discussed above in one or more of the storage circuits. The computing system 100 can further communicate one or more of the various processing results or data between devices using one or more of the communication circuits.

For example, the user device can send the sensor data, the location data, or a combination thereof to the cloud or the server, as represented by the second device 106 of FIG. 1, based on the match for the vertical change trigger 330, the vertical movement event 332, or a combination thereof. The second device 106 can determine the vertical change trigger 330, the transition location and type, calculate the relative altitude 306 of FIG. 3, or a combination thereof.

Also for example, the user device can perform or execute all of the steps in FIG. 10 preceding the step 730. The user device can upload the relative altitude 306, the transition location and type, or a combination thereof to the second device based on the vertical movement event 332.

It has been discovered that the use of the low-power circuit to detect a match for the vertical change trigger 330 and then initiate the high-power circuit provides increased battery life for the end user device. The use of the low-power circuit to perform initial monitoring and checking can utilize lower energy than the high-power circuit. Using the vertical change trigger 330 to initiate the high-power circuit to fully recognize the vertical movement event 332 with higher accuracy can provide a more efficient usage of power without sacrificing accuracy.

It has also been discovered that communicating or uploading the relative altitude 306 calculated by the end user device based on or subsequent to the vertical movement event 332 provides increased overall processing efficiency. The uploading of the relative altitude 306 instead of or representing the raw sensor data can decrease the amount of data stored or processed at the second device 106. Also, uploading of the relative altitude 306 based on or subsequent to the vertical movement event 332 can further decrease the amount of data stored or processed at the second device 106.

Referring now to FIG. 11, therein is shown a detailed exemplary flow chart for vertically locating step 710 of FIG. 7. The computing system 100 can vertically locate the end user or the user device based on determining entry step 714.

The computing system 100 can vertically locate the first device 102 of FIG. 1, the further device 108 of FIG. 1, or a combination thereof based on, in response to, subsequent to, or a combination thereof relative to determination of the entry-exit event 238 of FIG. 2 representing entrance into the building structure 202 of FIG. 2 as discussed above. The vertically locating step 710 can represent the vertical localization mechanism 302 of FIG. 3.

The vertically locating step 710 can be integral with, can connected to, can include, or a combination thereof relative to the tracking of the internal movements in the step 706 of FIG. 7 discussed above. The vertical location step 710 can include communication of map in step 1102, determination of the environment data in step 724, calculation of relative height in step 726, vertical location of the user device step in step 1104, communication or storage of the data in step 730, determination of process trigger in step 722, determination of exit event in step 720, or a combination thereof.

The computing system 100 can communicate the map in the step 1102. The computing system 100 can communicate the map based on accessing the internal map 206 of FIG. 2. The computing system 100 can have the first device 102 of FIG. 1, the further device 108 of FIG. 1, or a combination thereof entering the building structure 202 access the internal map 206 of the building structure 202. The computing system 100 can further have the second device 106 of FIG. 1 access the internal map 206 for tracking the end user device within the building structure 202.

The computing system 100 can communicate and access the internal map 206 generated for vertically locating the system user 110 of FIG. 1, the further user 112 of FIG. 1, or a combination thereof associated with the end user device. The computing system 100 can use the internal map 206 to locate the end user device on a specific instance of the tier 210 of FIG. 2 within the building structure 202. The computing system 100 can vertically locate the end user device to an instance of the tier 210 specific to the building structure 202 instead of an altitude or a height measurement.

The computing system 100 can use one or more of the storage interfaces, one or more of the control interfaces, or a combination thereof to access the internal map 206 of the building structure 202 corresponding to the entry-exit event 238 within a single device. The computing system 100 can further use one or more of the communication circuit, one or more of the control circuit, or a combination thereof access the internal map 206 across devices by sending and receiving the internal map 206.

The computing system 100 can determine the environment data in the step 724. The computing system 100 can determine the environment data by determining the sensor data including the environment measurement 228 of FIG. 2 or the movement measurement 234 of FIG. 2 as discussed above. The computing system 100 implement or execute the step 724 in response to, based on, subsequent to, or a combination thereof relative to the determination of the entry event in the step 714, determination of the process trigger in the step 722, or a combination thereof.

The computing system 100 can calculate the relative height in the step 726. The computing system 100 can calculate the relative height by determine the relative altitude 306 of FIG. 3 as discussed above. The computing system 100 can calculate the relative altitude 306 based on the environment data determined in the step 724.

The computing system 100 can vertically locate the user in the step 1104. The computing system 100 can vertically locate the user by determining the user current floor 308 of FIG. 3. The computing system 100 can vertically locate the first device 102, the further device 108, or a combination thereof that entered the building structure 202 based on determining the user current floor 308 representing the tier 210 within the internal map 206 of the building structure 202.

The computing system 100 can determine the user current floor 308 based on the relative altitude 306 of the end user device and the internal map 206 including the vertical profile 208 of FIG. 2. For example, the computing system 100 can determine the user current floor 308 as the instance of the tier 210 matching the relative altitude 306 according to the relative tier altitude 212 of FIG. 3, the tier separation profile 214 of FIG. 3, or a combination thereof.

The computing system 100 can use the floor localization module 610 of FIG. 6 to vertically locate the user. The computing system 100 can further use one or more of the control circuits to compare values and determine the user current floor 308.

The computing system 100 can communicate or store the data in the step 730. The computing system 100 can communicate or store the various data as discussed above. The computing system 100 can further store the user current floor 308 in one or more of the control circuits. The computing system 100 can further use one or more of the communication circuits to send and receive the user current floor 308 between devices.

The computing system 100 can determine the process trigger in the step 722. The computing system 100 can determine the process trigger based on determining a match for the vertical change trigger 330 of FIG. 3, based on determining the vertical movement event 332 of FIG. 3, or a combination thereof. The control flow can pass to the determination of environment data in the step 724 based on determining the process trigger.

The computing system 100 can further determine the exit event in the step 720. The computing system 100 can determine the exit event by determining the entry-exit event 238 corresponding to exit of the end user device from the building structure 202 as discussed above. The computing system 100 can implement or execute the step 720 after or wile implementing or executing the step 722. The computing system 100 can further implement or execute the step 720 simultaneous as or parallel to the other detailed steps within the step 710, the step 706, or a combination thereof.

It has been discovered that the user current floor 308 based on the relative altitude 306 provides increased accuracy in vertically locating the user. The relative altitude 306 can be used to normalize and map user device and leverage variety of devices regardless of time through crowd-sourcing mechanism.

It has further been discovered that the user current floor 308 based on the internal map 206 according to unsupervised mechanism, such as the tier mapping mechanism 226 of FIG. 2 or the vertical localization mechanism 302, provides increased usability and robustness. The use of relative altitude 306 allows for mapping and localizing processes without the direct user input 114 of FIG. 1 and without the structural base-information 116 of FIG. 1.

The computing system 100 can use the user current floor 308 to provide various features. For example, the computing system 100 can access floor-specific information, such as 2-dimensional map of the user current floor 308, the tier-change access location 216, the tier-change type 218, or a combination thereof. Also for example, the computing system 100 can generate notices or communications for recommendations or information specific to or available on the user current floor 308.

As a more specific example, the computing system 100 can provide a specific instance of the tier-change access location 216 for an emergency situation. The computing system 100 can notify the system user 110 of tier-change access location 216 appropriate for evacuation based on the tier-change type 218. Also as a more specific example, the computing system 100 can notify emergency services regarding the user current floor 308, the horizontal location of the system user 110 thereon, or a combination thereof.

Also as a more specific example, the computing system 100 can provide a specific instance of the tier-change access location 216 based on context or situation of the system user 110. The computing system 100 can suggest to the system user 110 of the vertical path 220 to increase physical activity or to meet physical activity goals, notify the system user 110 of the elevator 224 when the system 110 is carrying a load or physically impaired, or a combination thereof.

Figure 12:
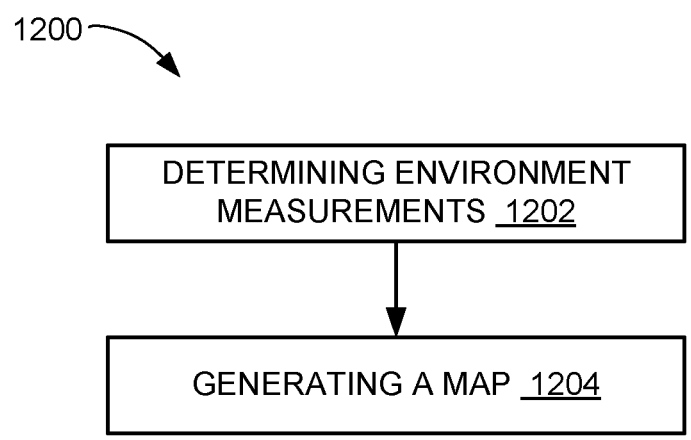
FIG. 12 is an exemplary flow chart of a method of operation of the computing system of FIG. 1 in a further embodiment.

Referring now to FIG. 12, therein is shown an exemplary flow chart of a method 1200 of operation of the computing system 100 of FIG. 1 in a further embodiment. The exemplary flow chart 1200 can include determining environment measurements representing conditions measured within a building structure located at a geographic location in a box 1202; and generating with a control circuit a map based on the environment measurements for mapping a tier of the building structure along a vertical direction in a box 1204.

The physical transformation from the relative altitude 306 of FIG. 3 of the user device and the internal map 206 of FIG. 2 of the building structure 202 results in the movement in the physical world, such as physical movement of the user device. Movement in the physical world results in updates of the sensor data, which can be fed back into the computing system 100 and adjust the relative altitude 306, the internal map 206, the user current floor 308 of FIG. 3, or a combination thereof.

The circuits, units, functions, or a combination thereof described herein can be hardware implementation or hardware accelerators, including passive circuitry, active circuitry, or both, in the first control circuit 412 of FIG. 4, the second control circuit 434 of FIG. 4, the third control circuit 512 of FIG. 5, or a combination thereof. The circuits, units, functions, or a combination thereof can also be hardware implementation or hardware accelerators, including passive circuitry, active circuitry, or both, within the first device 102 of FIG. 1, the second device 106 of FIG. 1, the further device 108 of FIG. 1, or a combination thereof but outside of the first control circuit 412, the second control circuit 434, the third control circuit 512, or a combination thereof.

The computing system 100 has been described with circuits, steps, functions or order as an example. The computing system 100 can partition the circuits or steps differently or order the circuits or steps differently. For example, the step 706 of FIG. 7 or a portion therein can be separately duplicated for the step 710 of FIG. 7. Also for example, the step 704 of FIG. 7 can be included in the step 702 of FIG. 7.

For illustrative purposes, the various circuits, functions, steps, or a combination thereof have been described as being specific to the first device 102, the second device 106, the further device 108, or a combination thereof. However, it is understood that the circuits, functions, steps, or a combination thereof can be distributed differently. For example, the various circuits, functions, steps, or a combination thereof can be implemented in a different device, or the functionalities of the circuits, functions, steps, or a combination thereof can be distributed across multiple devices. Also as an example, the various circuits, functions, steps, or a combination thereof can be stored in a non-transitory memory medium.

As a more specific example, one or more functions, steps, or a combination thereof described above can be stored in the non-transitory memory medium for distribution to a different system, a different device, a different user, or a combination thereof. Also as a more specific example, the functions or steps described above can be implemented or stored using a single hardware unit or circuit, such as a chip or a processor, or across multiple hardware units or circuits.

The functions or steps described in this application can be stored in the non-transitory computer readable medium. The first storage circuit 414 of FIG. 4, the second storage circuit 446 of FIG. 4, the third storage circuit 514 of FIG. 5, or a combination thereof can represent the non-transitory computer readable medium. The first storage circuit 414, the second storage circuit 446, the third storage circuit 514, or a combination thereof, or a portion therein can be removable from the first device 102, the second device 106, the further device 108, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    a control circuit configured to:
        determine environment measurements representing conditions measured about a building structure located at a geographic location;
        normalize a device altitude, calculated from the environment measurements, by removing inconsistencies in the device altitude due to differences in weather conditions;
        generate a map based on the environment measurements for mapping a tier of the building structure along a vertical direction, including identifying an existence and a vertical location of the tier within the building structure; and
    a storage circuit, coupled to the control circuit, configured to store the map for representing the building structure.

2. The computing system as claimed in claim 1 wherein the control circuit is configured to:
    determine a tier-change access location based on the environment measurements, the tier-change access location for representing a location providing a vertical connection to or from the tier of the building structure; and
    generate the map including the tier-change access location for locating the tier-change access location on the tier.

3. The computing system as claimed in claim 1 wherein the control circuit is configured to:
    determine relative altitudes for representing the environment measurements corresponding to the device altitude relative to an entry-exit altitude; and
    generate the map based on the relative altitudes representing the environment measurements.

4. The computing system as claimed in claim 1 wherein the control circuit is configured to:
    determine relative altitudes based on a device adjustment measure for calibrating the environment measurements relative to a calibration location; and
    generate the map based on the relative altitudes representing the environment measurements.

5. The computing system as claimed in claim 1 wherein the control circuit is configured to:
    identify a relative vertical cluster based on the environment measurements for representing locations along the vertical direction;
    identify the tier based on the relative vertical cluster; and
    generate the map including mapping of the tier.

6. The computing system as claimed in claim 1 wherein the control circuit is configured to:
    determine the environment measurements based on receiving relative altitudes representing the environment measurements including pressure measurement, movement measurement, or a combination thereof measured following a vertical movement event; and
    generate the map based on the relative altitudes using an unsupervised mechanism without utilizing a direct user input and without utilizing a structural base-information.

7. The computing system as claimed in claim 6 wherein the control circuit is configured to:
    determine a tier-change type corresponding to a tier-change access location based on the environment measurements, wherein the tier-change type is for representing a vertical path, an escalator, an elevator, or a combination thereof within the building structure; and
    generate the map including the tier-change type at the tier-change access location for identifying the tier-change access location on the tier.

8. The computing system as claimed in claim 1 wherein the control circuit is configured to determine relative altitudes for normalizing the environment measurements across a first device and a further device sourcing the environment measurements.

9. The computing system as claimed in claim 1 wherein the control circuit is configured to determine relative altitudes for normalizing the environment measurements corresponding to different time stamps.

10. The computing system as claimed in claim 6 wherein the control circuit is configured to generate the map for vertically locating a user on the tier within the building structure.

11. A method of operation of a computing system comprising:
   determining environment measurements representing conditions measured about a building structure located at a geographic location; and
   normalizing a device altitude, calculated from the environment measurements, by removing inconsistencies in the device altitude due to differences in weather conditions;
   generating with a control circuit a map based on the environment measurements for mapping a tier of the building structure along a vertical direction, including identifying an existence and a vertical location of the tier within the building structure.

12. The method as claimed in claim 11 wherein:
   determining the environment measurements includes determining one or more of the environment measurements based on detecting a vertical movement event of a device;
further comprising
   calculating a relative altitude based on the one or more of the environment measurements from the device for normalizing the one or more of the environment measurements to locate the device along the vertical direction using the map of the building structure.

13. The method as claimed in claim 12 further comprising:
   determining movement measurement with the device;
   detecting with a low-power circuit of the device a vertical change trigger based on monitoring the movement measurement of the device; and
   detecting with a higher-powered circuit of the device the vertical movement event based on the vertical change trigger using the movement measurement, the one or more of the environment measurements from the device, or a combination thereof.

14. The method as claimed in claim 12 further comprising:
   determining a device location for locating the device outside of the building structure;
   identifying a calibration location based on the device location;
   determining a calibration event based on comparing the calibration location and the device location; and
wherein:
   determining the environment measurements includes determining the one or more of the environment measurements from the device based on the calibration event for calculating a device adjustment measure associated with the environment measurements from the device.

15. The method as claimed in claim 11 further comprising:
   determining a device location for locating the device outside of the building structure;
   determining an entry-exit event based on the device location; and
wherein:
   determining the environment measurements includes determining the environment measurement based on the entry-exit event for calculating an entry-exit altitude.

16. A non-transitory computer readable medium including instructions executable by a control circuit for a computing system, the instructions comprising:
   determining environment measurements representing conditions measured about a building structure located at a geographic location; and
   normalizing a device altitude, calculated from the environment measurements, by removing inconsistencies in the device altitude due to differences in weather conditions;
   generating a map based on the environment measurements for mapping a tier of the building structure along a vertical direction, including identifying an existence and a vertical location of the tier within the building structure.

17. The non-transitory computer readable medium as claimed in claim 16, wherein the instructions include:
   determining the environment measurements includes determining one or more of the environment measurements using a device based on detecting a vertical movement event corresponding to the device; and
   calculating a relative altitude based on the one or more of the environment measurements from the device for normalizing the one or more of the environment measurements to locate the device along the vertical direction using the map of the building structure.

18. The non-transitory computer readable medium as claimed in claim 16, wherein the instructions include:
   determining a tier-change access location based on the environment measurements, the tier-change access location for providing a vertical connection to or from the tier of the building structure; and
wherein:
   generating the map includes generating the map including the tier-change access location for locating the tier-change access location on the tier.

19. The non-transitory computer readable medium as claimed in claim 16, wherein the instructions include:
   determining relative altitudes for representing the environment measurements corresponding to the device altitude relative to an entry-exit altitude; and
wherein:
   generating the map includes generating the map based on the relative altitudes representing the environment measurements.

20. The non-transitory computer readable medium as claimed in claim 16, wherein the instructions include:
   determining relative altitudes based on a device adjustment measure for calibrating the environment measurements relative to a calibration location; and
wherein:
   generating the map includes generating the map based on the relative altitudes representing the environment measurements.

* * * * *